United States Patent
Obara et al.

(10) Patent No.: US 8,000,203 B2
(45) Date of Patent: Aug. 16, 2011

(54) APPARATUS FOR RECORDING INFORMATION ONTO SURFACE USING ELECTRON BEAM

(75) Inventors: Takashi Obara, Kanagawa (JP); Takeshi Miyazaki, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 288 days.

(21) Appl. No.: 12/282,306

(22) PCT Filed: Mar. 12, 2007

(86) PCT No.: PCT/JP2007/055330
§ 371 (c)(1),
(2), (4) Date: Sep. 9, 2008

(87) PCT Pub. No.: WO2007/105817
PCT Pub. Date: Sep. 20, 2007

(65) Prior Publication Data
US 2009/0059773 A1    Mar. 5, 2009

(30) Foreign Application Priority Data

Mar. 13, 2006  (JP) .................................. 2006-067977
Jan. 12, 2007   (JP) .................................. 2007-005045

(51) Int. Cl.
*G11B 9/10* (2006.01)
(52) U.S. Cl. ..................................... 369/101; 250/492.3
(58) Field of Classification Search .......................... None
See application file for complete search history.

(56) References Cited

U.S. PATENT DOCUMENTS 3,152,238 A * 10/1964 Anderson ................ 219/121.12
4,973,849 A * 11/1990 Nakamura et al. ......... 250/492.2
5,304,811 A *  4/1994 Yamada et al. ........... 250/492.22
5,894,124 A *  4/1999 Iwabuchi et al. ............. 250/310
6,831,281 B2 * 12/2004 Nakasuji .................. 250/492.22
7,053,394 B2 *  5/2006 Abe ......................... 250/559.38

(Continued)

FOREIGN PATENT DOCUMENTS

EP   1187121    3/2002

(Continued)

OTHER PUBLICATIONS

English machine translation of JP Pat. No. 2002-217086 A (Mukai et al., System and Method for Irradiating Electron Beam, Aug. 2, 2002, pp. 1-16).*

(Continued)

*Primary Examiner* — Hoa T Nguyen
*Assistant Examiner* — Mark L Fischer
(74) *Attorney, Agent, or Firm* — Dickstein Shapiro LLP

(57) ABSTRACT

An electron beam recording apparatus is disclosed that records information onto the surface of a sample by using an electron beam. The electron beam recording apparatus includes an electron source that irradiates the electron beam, a magnetic detector that is configured to move onto and out of an irradiation axis and acquires magnetic information on the irradiation axis, a convergence position control part that calculates a convergence position correction amount for correcting a convergence position of the electron beam with respect to the surface of the sample based on the magnetic information, and a convergence position adjusting part that adjusts the convergence position of the electron beam with respect to the surface of the sample. The convergence position control part causes the convergence position adjusting part to adjust the convergence position of the electron beam with respect to the surface of the sample based on the convergence position correction amount.

2 Claims, 12 Drawing Sheets

U.S. PATENT DOCUMENTS

| | | | |
|---|---|---|---|
| 7,612,337 B2 * | 11/2009 | Suzuki et al. | 250/310 |
| 2002/0018110 A1 | 2/2002 | Andersson et al. | |
| 2002/0038852 A1 * | 4/2002 | Suzuki | 250/396 ML |
| 2002/0041549 A1 | 4/2002 | Obara | |
| 2003/0038244 A1 | 2/2003 | Thomas et al. | |
| 2003/0205678 A1 | 11/2003 | Notte, IV | |
| 2004/0079884 A1 | 4/2004 | Khursheed et al. | |
| 2004/0119024 A1 * | 6/2004 | Avnery | 250/397 |
| 2004/0130983 A1 * | 7/2004 | Tsukuda et al. | 369/44.36 |
| 2004/0166426 A1 | 8/2004 | Tsukuda et al. | |
| 2004/0208094 A1 | 10/2004 | Obara | |
| 2004/0227079 A1 * | 11/2004 | Nara et al. | 250/310 |
| 2005/0201246 A1 | 9/2005 | Buschbeck et al. | |

FOREIGN PATENT DOCUMENTS

| | | |
|---|---|---|
| EP | 1267340 | 12/2002 |
| JP | 6-131706 | 5/1994 |
| JP | 3040887 | 3/2000 |
| JP | 2002-92977 | 3/2002 |
| JP | 2002-162871 | 6/2002 |
| JP | 2002-217086 | 8/2002 |
| JP | 2002-258596 | 9/2002 |
| JP | 2003-84513 | 3/2003 |
| JP | 2003-124683 | 4/2003 |
| JP | 2004-185786 | 7/2004 |
| JP | 2006-59513 | 3/2006 |
| WO | WO-2006/009295 | 1/2006 |

OTHER PUBLICATIONS

Office Action of Notice of rejection of Korean Patent Application No. 10-2008-7021999 (with English translation dated Jun. 25, 2009) (8 pages).

* cited by examiner

APPARATUS FOR RECORDING INFORMATION ONTO SURFACE USING ELECTRON BEAM

TECHNICAL FIELD

The present invention relates to an electron beam recording apparatus that records information by irradiating an electron beam onto a predetermined position, and particularly relates to an electron beam recording apparatus used for producing a master of optical disks by printing a pattern with an electron beam.

BACKGROUND ART

In recent years, there has been a growing demand for accuracy improvement of microfabrication technology such as exposure technology for master optical disks and semiconductor technology. For example, optical disks are fabricated through a master disk production process for producing a stamper from a glass plate and a disk production process for producing optical disks with use of an injection mold with the stamper mounted thereon.

In a typical master disk production process, a master disk production machine emits a visible light, an ultraviolet laser light, or the like from the light source in an ambient atmosphere and focuses the light to have a spot diameter of the level of wavelength by a high power objective lens. With this light, a pit pattern latent image corresponding to information signals or the like to be recorded is formed on a glass plate having a photoresist layer on a principal surface thereof. After cutting the photoresist layer, the glass plate goes through a development process or an electroforming process so as to be a stamper.

While cutting the master disk, the master disk production machine rotates the master disk so as to relatively move the irradiation position of the visible light or the ultraviolet light in the radial direction of the master disk. A problem with such a master disk cutting process using a visible light or an ultraviolet laser light is that the recording resolution of information signals to be recorded is limited due to limitations of a light spot diameter, resulting in preventing high density recording.

Cutting by electron beams is able to form finer patterns compared with cutting by laser beams.

In a typical master disk production machine using an electron beam, however, the electron beam is deflected by magnetic field fluctuations inside and outside of the machine, which leads to a variation of a spot position of the electron beam focused by a focusing unit. This lowers accuracy of the track pitch of master disks or causes reproduction jitter.

The causes of the magnetic field fluctuations inside and outside the machine include variation of earth magnetism due to movement of vehicles, elevators, or the like, electromagnetic waves emitted from power supply systems such as cabinet panels, and magnetism generated by a rotating mechanism or a disk transport mechanism of the master disk production machine.

Especially, the magnetism generated by the rotating mechanism, the disk transport mechanism, or the like causes a significant variation of the electron beam irradiation position. There are therefore proposed various methods for reducing influence of the magnetism generated by the rotating mechanism or the disk transport mechanism, or the like (see Patent Documents 1-3).

Patent Document 1 discloses, as a method of removing noise, a magnetic shield device that blocks magnetic noise attempting to enter a box-shaped magnetic shield room having a wall made of a high permeability member.

The magnetic shield device disclosed in Patent Document 1 includes a detection coil passing through holes of a wall and wound around the wall for outputting an induced voltage corresponding to variation of magnetic noise as a detection signal, a cancel coil receiving an external current so as to generate a magnetic field for compensating for the magnetic noise detected by the detection coil, and a controller for controlling a current to be supplied to the cancel coil based on the output of the detection coil. A pair of Helmholtz coil is used as the cancel coil that generates a magnetic field in the same direction as magnetic flux detected by the detection coil.

Patent Document 2 discloses an information recorder that includes a rotating unit for rotating a master of information recording media, an irradiating unit for irradiating an information recording electron beam onto a recording surface of the master, a transport unit for relatively moving the master and the irradiating unit in a direction parallel to the recording surface, and a vacuum atmosphere forming unit for accommodating the rotating unit and the irradiating unit in a vacuum atmosphere.

According to Patent Document 2, the rotating unit of the information recorder includes a turntable on which the master is placed, a spindle shaft for supporting the turntable, an electromagnetic motor for rotating the spindle shaft, and a magnetic shield unit for shielding against magnetism generated in the electromagnetic motor.

In the information recorder of Patent Document 2, in order to reduce magnetic noise from the electromagnetic motor, the entire electromagnetic motor is surrounded by a magnetic casing (high permeability material) for blocking the magnetism, thereby preventing an electron beam from being influenced by an electromagnetic field generated by the electromagnetic motor.

Patent Document 3 discloses an electron beam irradiation device and a method for eliminating influence of magnetism generated from a rotating mechanism or a master transport mechanism and magnetism in the vicinity of an electron gun. The electron beam irradiation device of Patent Document 3 drives an electron beam deflection electrode according to outputs of plural magnetic detectors disposed in the vicinity of an electron beam generator or in a vacuum chamber, deflects an electron beam in a direction for canceling deflection of the electron beam due to variation of magnetic field, and thus corrects displacement of an electron beam focus spot on a master due to the variation of magnetic field.

<Patent Document 1> Japanese Patent Application Publication No. 2003-124683
<Patent Document 2> Japanese Patent Application Publication No. 6-131706
<Patent Document 3> Japanese Patent Application Publication No. 2002-217086

Referring back to the magnetic shield device disclosed in Patent Document 1, although the cancel coil needs to be highly accurately mounted, it is difficult to accurately mount the Helmholtz coil because of its relatively large size. If the Helmholtz coil is not formed in an ideal shape, the magnetic field generated by the Helmholtz coil is not uniform, resulting in lowering of device accuracy. Moreover, a facility using the magnetic shield device of Patent Document 1 is large and expensive.

Referring to the information recorder of Patent document 2, the electromagnetic motor includes a rotating part, and hence it is difficult to completely shield magnetism of the entire electromagnetic motor by surrounding the entire electromagnetic motor with the magnetic casing (high permeability material).

Another problem with the information recorder disclosed in Patent Document 2 is that, if a large amount of high permeability material is used, the weight of the rotating unit is increased.

Still another problem with the information recorder of Patent Document 2 is that, if a magnetic shield for the entire device is also provided, a magnetic field is generated in the direction of the electron beam irradiation axis in a magnetic shield opening of the irradiating unit and an opening of the magnetic casing of the rotating unit. The generated magnetic field affects the electron beam, which prevents accurate correction of a focal point and results in lowering of exposure quality.

Referring to the electron beam irradiation device of Patent Document 3, according to the method of correcting the displacement of the electron beam focus spot on the master due to the variation of magnetic field and adjusting a focal point of the electron beam relative to a target object, as the plural magnetic detectors estimate a magnetic field in the vicinity of an irradiation point of the electron beam, a disturbance magnetic field of an electron beam injecting part cannot be accurately calculated. Accordingly, the electron beam irradiation device of Patent Document 3 cannot accurately correct the focal point, and therefore exposure quality is lowered.

Further, according to Patent Document 3, for reasons of device configuration, the entire electron beam irradiation device needs to be magnetically shielded for eliminating influence of earth magnetism. However, since there are many constraints on workability and structure such as ventilation and air conditioning facility, this configuration is not so effective for variation of a magnetic field generated inside the shielded device. Furthermore, since the entire device is magnetically shielded, the electron beam irradiation device is large and expensive.

DISCLOSURE OF THE INVENTION

The present invention aims to provide an electron beam recording apparatus capable of recording information by irradiating an electron beam onto a predetermined position of a sample with high positional accuracy.

In one embodiment of the present invention, there is provided an electron beam recording apparatus that records information onto the surface of a sample by using an electron beam. The electron beam recording apparatus comprises an electron source that irradiates the electron beam, a magnetic detector that is configured to move onto and out of an irradiation axis and acquires magnetic information on the irradiation axis, a convergence position control part that calculates a convergence position correction amount for correcting a convergence position of the electron beam with respect to the surface of the sample based on the magnetic information acquired by the magnetic detector, and a convergence position adjusting part that adjusts the convergence position of the electron beam with respect to the surface of the sample. The convergence position control part causes the convergence position adjusting part to adjust the convergence position of the electron beam with respect to the surface of the sample based on the convergence position correction amount.

According to an aspect of the present invention, the electron beam recording apparatus can perform the convergence position control of the electron beam with high accuracy by calculating a displacement of the convergence position of the electron beam with respect to the sample due to the magnetic field on the irradiation axis. Therefore, the electron beam is irradiated onto a predetermined position of the sample with high positional accuracy for recording the information. Moreover, since the electron beam is irradiated onto a predetermined position of the sample with high positional accuracy, printing on the surface of the sample can be performed with high shape accuracy.

According to another aspect of the present invention, in the electron beam recording apparatus, since focal position displacement of the electron beam with respect to the sample due to the magnetic field on the irradiation axis is experimentally calculated based on focal position adjustment information obtained when a focal position is adjusted with respect to particles on the surface of a test substrate, focal position control of the electron beam can be performed with high accuracy. Therefore, the electron beam is irradiated onto a predetermined position of the sample with high positional accuracy for recording the information. Moreover, since the electron beam is irradiated onto a predetermined position of the sample with high positional accuracy, printing on the surface of the sample can be performed with high shape accuracy. Furthermore, since the displacement of the convergence position is experimentally computed using the test substrate with the particle on the surface, the electron beam recording apparatus is simple and inexpensive.

According to still another aspect of the present invention, in the electron beam recording apparatus, since an irradiation position displacement of the electron beam with respect to the sample due to the magnetic field on the irradiation axis is experimentally calculated based on irradiation position adjustment information obtained when an irradiation position is adjusted with respect to particles on the surface of a test substrate, irradiation position control of the electron beam can be performed with high accuracy in addition to the focal position control of the electron beam. Therefore, the electron beam is irradiated onto a predetermined position of the sample with higher positional accuracy for recording the information. Moreover, since the electron beam is irradiated onto a predetermined position of the sample with higher positional accuracy, printing on the surface of the sample can be performed with higher shape accuracy.

According to a further aspect of the present invention, since the convergence position adjusting part includes an electrostatic lens, the electron beam recording apparatus can perform convergence position adjustment (focal position) adjustment with high responsivity and can perform printing (recording) with high shape accuracy even when driven at high speed.

BEST MODE FOR CARRYING OUT THE INVENTION

Figure 1:
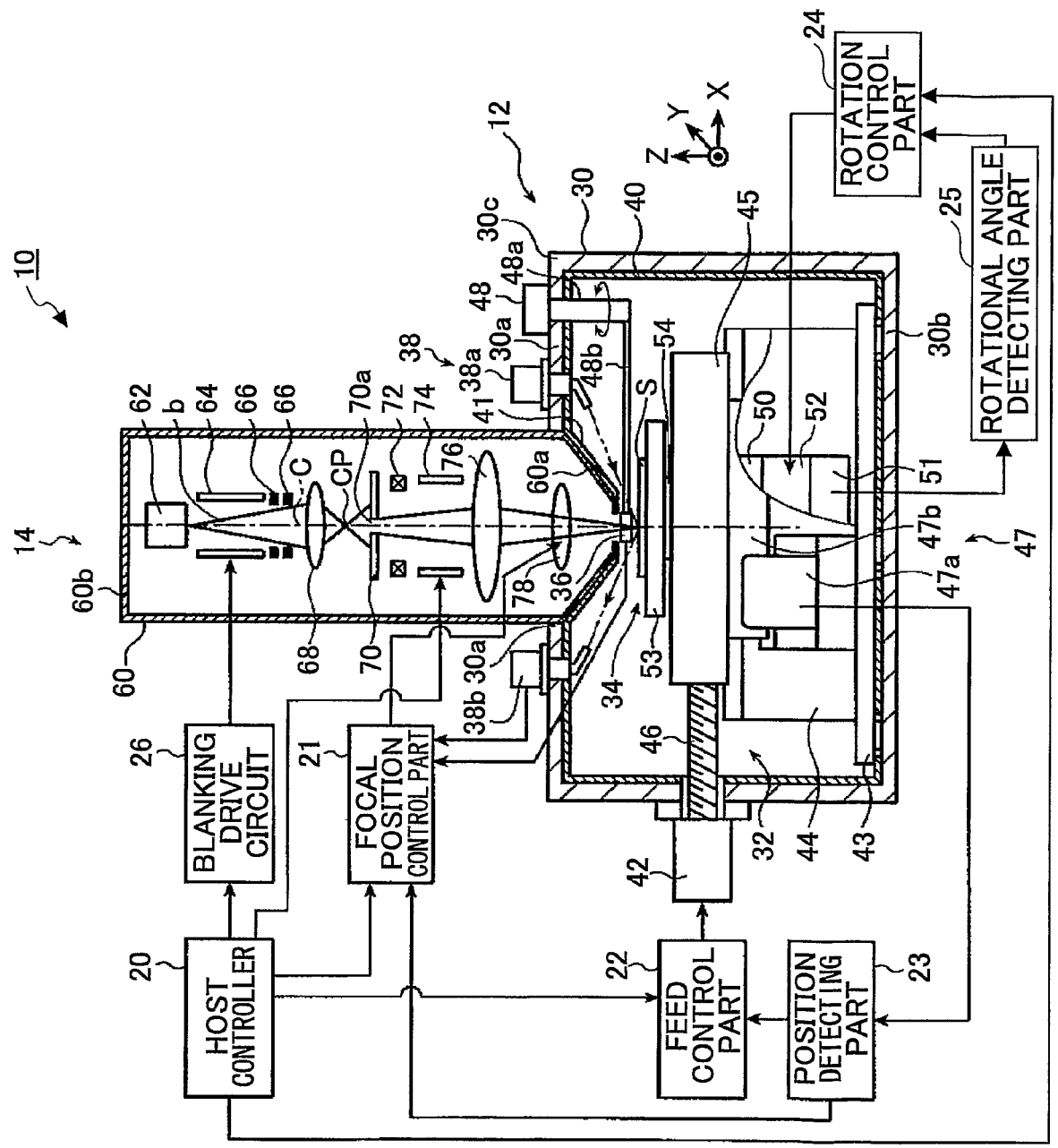
FIG. 1 is a schematic diagram showing an electron beam recording apparatus according to a first embodiment of the present invention.

In the following, an electron beam recording apparatus according to the present invention is described with reference to the accompanying drawings. FIG. 1 is a schematic diagram showing an electron beam recording apparatus 10 according to a first embodiment of the present invention.

The electron beam recording apparatus 10 is used, for example, for producing an optical disk master by printing a pattern on a glass substrate.

The electron beam recording apparatus 10 includes a printing part 12, an electron beam generator 14, a host controller 20, a focal position control part 21, a feed control part 22, a position detecting part 23, a rotation control part 24, and a rotational angle detecting part 25.

The host controller 20 is connected to and controls the focal position control part (convergence position control part) 21, the feed control part 22, and the rotation control part 24.

The host controller 20 is also connected to and controls, for example, an electron source 62 described below.

The printing part 12 is disposed, for example, below the electron beam generator 14 (the electron source 62), and is provided with, inside a vacuum chamber 30, a feed mechanism unit 32, a rotating mechanism unit 34, a magnetic detector 36, and a height sensor 38. The vacuum chamber 30 is arranged, for example, on a vibration isolation mechanism part (not shown) such as an air pressure servo mounter.

The vacuum chamber 30 has an opening part 30a at the upper side thereof, to which the electron beam generator 14 (a tip end portion 60a of a lens barrel 60) is connected.

A magnetic shield plate 40 is disposed on the entire inner surface of the vacuum chamber 30. The magnetic shield plate 40 is made of a material of a high magnetic permeability such as permalloy so as to reduce disturbance due to such as the earth's magnetism.

The feed mechanism unit 32 includes a drive motor 42, a base 43, a platform 44, a mobile body 45, a feed screw 46, and a position sensor 47.

The base 43 is disposed on a bottom part 30b of the vacuum chamber 30 with the magnetic shield plate 40 interposed therebetween. The platform 44 is arranged on the base 43. The mobile body 45 is disposed on the platform 44 with, e.g., a rolling bearing (not shown) such as a sphere or a cylindrical roller arranged in the feed direction, interposed therebetween.

A guide 47a is provided under the mobile body 45. A detector 47b is also provided, which constitutes the position sensor 47 together with the guide 47a. While the guide 47a is provided on the mobile body 45, the detector 47b is provided on the platform 44. The position sensor 47 is, e.g., a linear scale such as a laser scale.

The position sensor 47 is connected to a position detecting part 23 so that the position sensor 47 outputs a detection signal representing the position of the mobile body 45 (a sample S) to the position detecting part 23. The position detecting part 23 outputs a detection signal (position information of the sample S) to the focal position control part 21.

The mobile body 45 has a receiving screw portion (not shown), into which the feed screw 46 is threaded. An end of the feed screw 46 projecting outside the vacuum chamber 30 is connected to the drive motor 42 mounted outside the vacuum chamber 30. The feed screw 46 includes a ball screw, for example.

The drive motor 42 is connected to the feed control part 22. The feed control part 22 controls rotation of the drive motor 42.

The mobile body 45 is moved in the X direction by the rotation of the drive motor 42 controlled by the feed control part 22. In the feed mechanism unit 32, the position sensor 47 outputs the detection signal to the position detecting part 23 to provide current position information of the mobile body 45, and then the position detecting part 23 outputs the current position information of the mobile body 45 to the feed control part 22. The rotation of the drive motor 42 is controlled according to an output signal of the feed control part 22 provided based on the current position information, so that the mobile body 45 is moved in the X direction. The feed mechanism unit 32 is provided with the rotating mechanism unit 34.

The rotating mechanism unit 34 includes an air spindle 50, an optical rotary encoder 51, a rotary drive motor 52, a turntable 53, and a magnetic fluid seal 54. The rotating mechanism unit 34 is moved together with the mobile body 45 in the X direction. The sample S is placed on and rotated by the turntable 53.

In the rotating mechanism unit 34, the air spindle 50 is fixed to the mobile body 45. The air spindle 50 is hydrostatically floated in the radial direction and the thrust direction by compressed air. The compressed air for the air spindle 50 is supplied from the outside of the vacuum chamber 30.

The turntable 53 is provided over the air spindle 50. The rotary drive motor 52 is provided below the air spindle 50. The rotary drive motor 52 is connected to the rotation control part 24, by which rotation of the rotary drive motor 52 is controlled. The rotation control part 24 is connected to and controlled by the host controller 20.

The optical rotary encoder 51 is fixed to the lower part of the rotary drive motor 52. The optical rotary encoder 51 generally outputs thousands of A phase pulses and B phase pulses per one turn and one Z phase pulse per one turn.

The optical rotary encoder 51 is connected to the rotational angle detecting part 25, which detects a rotational angular position based on an output signal of the optical rotary encoder 51 and acquires rotational speed information. The rotational angle detecting part 25 is connected to the rotation control part 24. The rotation control part 24 controls rotation of the rotary drive motor 52 based on the rotational speed information acquired by the rotational angle detecting part 25. Rotation of the rotary drive motor 52 causes rotation of the turntable 53. The turntable 53, together with the mobile body 45, is moved also in the X direction (in-plane) orthogonal to an irradiation axis C by the feed mechanism unit 32.

The irradiation axis C is a vertical line extending downward from the electron source 62.

The inside of the vacuum chamber 30 is evacuated to a vacuum. When the air spindle 50 is provided in vacuum as described above, it is common to provide the magnetic fluid seal 54 on the outer periphery of the air spindle 50 for the purpose of vacuum seal. In addition to the magnetic fluid seal 54, a seal mechanism such as differential evacuation is generally provided on the outer periphery of the air spindle 50.

The magnetic detector 36 is provided in the vacuum chamber 30. The magnetic detector 36 can move onto and out of the irradiation axis C and acquire magnetic information on the irradiation axis C.

The magnetic detector 36 is connected to a tip end of an arm 48b of a rotary shaft 48a extending in the vertical direction of a rotator 48 provided on an upper face portion 30c of the vacuum chamber 30.

The rotary shaft 48a of the rotator 48 can be moved by air pressure. The magnetic detector 36 moves onto the irradiation axis C of an electron beam b only when performing measurement of magnetic fields and otherwise stays out of the irradiation axis C.

The magnetic detector 36 is connected to the focal position control part 21, and outputs information of measured magnetic flux density (magnetic information) of each position of the mobile body 45 to the focal position control part 21.

The magnetic detector 36 is able to acquire the magnetic flux density information (magnetic information) of three directions, i.e., a focus direction in which a focal position is adjusted (hereinafter referred to as the Z direction), the X direction that is orthogonal to the Z direction and is the moving direction of the mobile body 45, and the Y direction orthogonal to the Z direction and the X direction. The magnetic detector 36 is not limited to specific sensors and may be any sensor well known in the art.

The magnetic detector 36 is not limited to the one capable of measuring magnetic flux density in three directions (the X, Y, and Z directions). In this embodiment, as described below, the magnetic detector 36 is for controlling the focal position of the electron beam b in the Z direction, and may be any detector capable of acquiring magnetic flux density information (magnetic information) at least in the Z direction.

The height sensor 38 is provided on the upper face portion 30c of the vacuum chamber 30. The height sensor 38 detects the surface height of the sample S or the height displacement of the sample S when the sample S is rotated or moved, and is based on laser triangulation.

The surface height of the sample S indicates, e.g., a distance from the surface of the turntable 53 as a datum plane in the Z direction. The height displacement of the sample S indicates, e.g., a displacement amount from the surface of the turntable 53 as a datum plane in the Z direction.

The height sensor 38 includes a light emitting part 38a and a light receiving part 38b.

The light emitting part 38a emits, e.g., a semiconductor laser beam (not shown). The light receiving part 38b receives a reflection light of the laser beam emitted by the light emitting part 38a and reflected by the surface of the sample S, and calculates the height of the sample S (height displacement of the sample S) based on the position where the reflection light is received. The light receiving part 38b includes a position sensitive detector (PSD) (not shown) and an arithmetic part (not shown).

The light receiving part 38b is connected to the focal position control part 21 so as to output the height calculated by the height sensor 38 as an output signal (height information) to the focal position control part 21.

The following describes the electron beam generator 14.

The electron beam generator 14 irradiates an electron beam b onto the surface of the sample S so as to record information on the surface of the sample S.

The electron beam generator 14 includes various component parts in the lens barrel 60. The lens barrel 60 includes the conically-shaped tip end portion 60a having an open tip end. The lens barrel 60 also includes a closed rear end portion 60b.

In the electron beam generator 14, the lens barrel 60 accommodates therein the electron source 62, a blanking electrode 64, an axis alignment coil 66, a focusing lens 68, a selector aperture 70, an astigmatism correction coil 72, an electrostatic deflection electrode (convergence position adjusting part) 74, an objective lens 76, and an electrostatic lens (convergence position adjusting part) 78, in this order from the rear end portion 60b. The tip end portion 60a of the lens barrel 60 is connected to the opening part 30a of the vacuum chamber 30.

A magnetic shield plate 41 is disposed on the outer periphery of the tip end portion 60a of the lens barrel 60 in order to reduce disturbance due to such as the earth's magnetism. The magnetic shield plate 41 is made of a material of a high magnetic permeability such as permalloy.

In the electron beam generator 14, the electron source (electron gun) 62 is of a thermal field irradiation type, and is arranged in an ultrahigh vacuum. The electron source 62 irradiates the electron beam b toward the turntable 53.

The irradiation of the electron beam b by the electron source 62 is controlled by the host controller 20.

The electron beam b irradiated by the thermal field irradiation type electron source 62 has a small diameter of about 20 through 50 nm. Therefore, in terms of obtaining the electron beam b with a small diameter, there is no need to reduce the diameter of the electron beam b focused on the surface of the sample S at a high reduction ratio relative to the diameter of the electron beam b irradiated by the electron source 62.

The blanking electrode 64 is used for controlling irradiation (ON/OFF) of the electron beam b onto the sample S in synchronization with scanning of the electron beam b when forming a printing pattern. More specifically, when the electron beam b is not deflected by the blanking electrode 64, the electron beam b is irradiated onto the surface of the sample S (ON). On the other hand, when the electron beam b is deflected by the blanking electrode 64, the electron beam b is not irradiated onto the surface of the sample S (OFF).

The blanking electrode 64 is connected to a blanking drive circuit 26. The blanking drive circuit 26 receives a printing blanking signal corresponding to the printing pattern to be printed on the surface of the sample S from the host controller 20, and outputs a control signal so as to control the irradiation of the electron beam b to the sample S.

The axis alignment coil 66 is disposed under the blanking electrode 64. The axis alignment coil 66 corrects an axial displacement of the electron beam b to be incident on the focusing lens 68.

The focusing lens 68 is a magnetic lens (electromagnetic lens) that focuses the electron beam b, of which axial displacement is corrected by the axis alignment coil 66, onto a crossover point CP. The objective lens 76 is a magnetic lens that focuses the electron beam b, which is focused on the crossover point CP by the focusing lens 68, onto the surface of the sample S. The focusing lens 68 and the objective lens 76 are arranged under the axis alignment coil 66 in this order.

The selector aperture 70 controls ON (writing)/OFF (stop writing) of the electron beam b based on information to be written during information writing process. More specifically, when the electron beam b is not deflected by the blanking electrode 64, the electron beam b passes through an opening 70a of the selector aperture 70 so as to be incident on the surface of the sample S (ON). On the other hand, when the electron beam b is deflected by the blanking electrode 64, the electron beam b is shielded by the selector aperture 70 (OFF).

The astigmatism correction coil 72 corrects astigmatism of the electron beam b and is arranged under the selector aperture 70.

The electrostatic deflection electrode 74 adjusts the irradiation position of the electron beam b in at least one of two directions (the X direction and the Y direction) orthogonal to a direction (the Z direction) in which the irradiation axis C extends. The electrostatic deflection electrode 74 is able to adjust the convergence position, especially the irradiation position.

The electrostatic deflection electrode 74 deflects the electron beam based on the information to be written during an information writing process so as to control the irradiation (spot) position of the electron beam b on the surface of the sample S. The electrostatic deflection electrode 74 is interposed between the astigmatism correction coil 72 and the objective lens 76.

Figure 2:
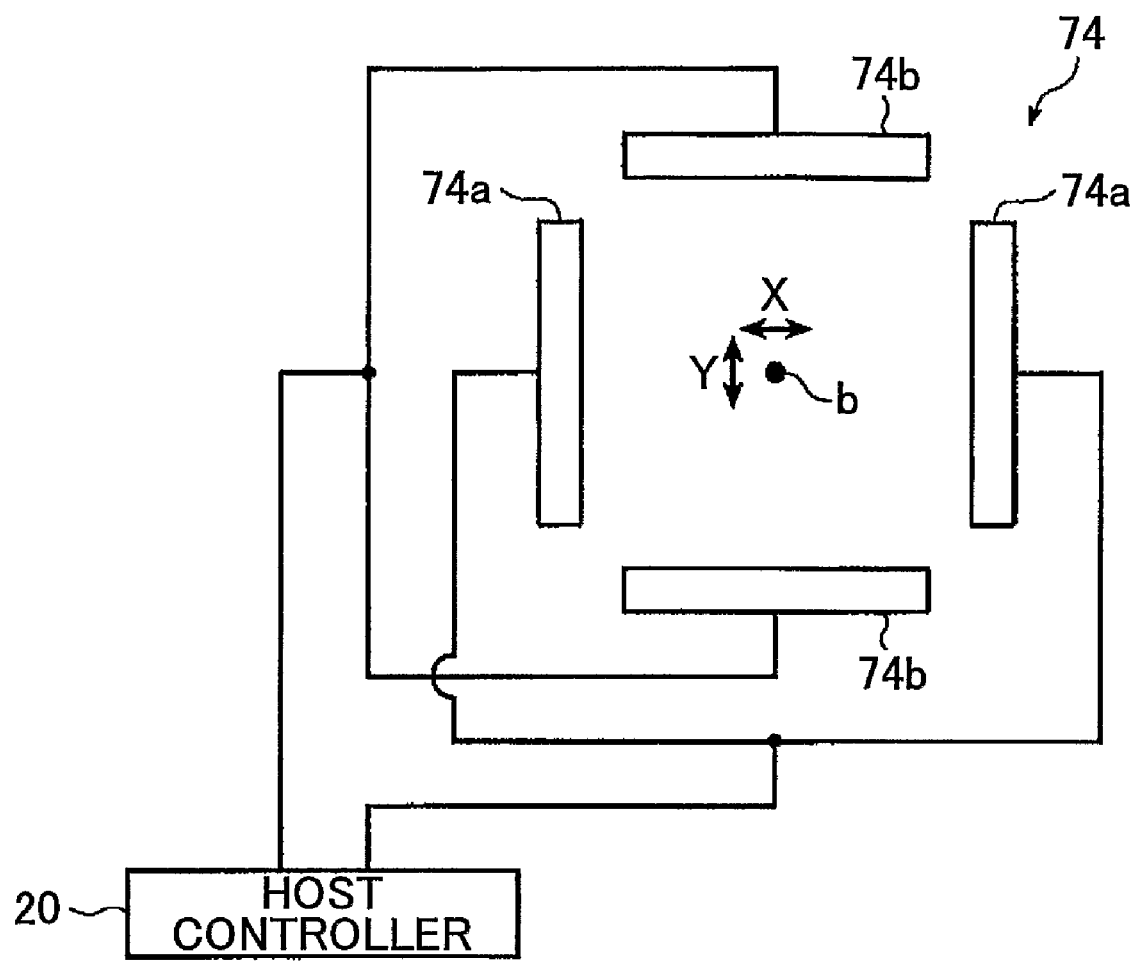
FIG. 2 is a schematic diagram showing a structure of an electrostatic deflection electrode of the electron beam recording apparatus according to the first embodiment of the present invention.

As shown in FIG. 2, the electrostatic deflection electrode 74 includes a pair of first deflection electrode plates 74a facing each other in the X direction and a pair of second deflection electrode plates 74b facing each other in the Y direction. Each of the pair of the first deflection electrode plates 74a and the pair of the second deflection electrode plates 74b is connected to the host controller 20.

In this embodiment, for deflecting the electron beam b in the X direction, the host controller 20 applies a voltage corresponding to the amount of deflection to the pair of the first deflection electrode plates 74a. Thus the position of the electron beam b to be irradiated onto the sample S in the X direction is adjusted. For deflecting the electron beam b in the Y direction, the host controller 20 applies a voltage corresponding to the amount of deflection to the pair of the second deflection electrode plates 74b. Thus the position of the electron beam b to be irradiated onto the sample S in the X direction is adjusted. In this way, the host controller 20 controls the deflection direction and deflection amount of the electron beam b.

The electrostatic lens (convergence position adjusting part) 78 adjusts the convergence position, especially adjusts the focal position of the electron beam b to meet the surface of the sample S. The electrostatic lens 78 is provided with a focus control part (not shown) for changing a focal length. The focus control part is capable of changing the focal length of the electrostatic lens 78 as desired.

The focus control part is connected to the focal position control part 21. The focal length of the electrostatic lens 78 is controlled by an output signal from (a voltage applied from) the focal position control part 21, so that the focal position of the electron beam b relative to the surface of the sample S is adjusted.

As the electrostatic lens 78 converges the electron beam b by electric field force, the responsiveness of the electrostatic lens 78 is higher than that of a magnetic lens that converges the electron beam b by magnetic field force.

In the electron beam generator 14 of this embodiment, the electron source 62 emits the electron beam b. After the axis alignment coil 66 corrects the axial displacement of the electron beam b, the focusing lens 68 focuses the electron beam b onto the crossover point CP. Then, the electron beam b passes through the opening 70a of the selector aperture 70. After that, the astigmatism correction coil 72 corrects astigmatism, and the objective lens 76 and the electrostatic lens 78 corrects the focal point. Thus the electron beam b is focused onto the surface of the sample S.

In the electron beam generator 14 of this embodiment, when writing information, the electron beam b irradiated from the electron source 62 is controlled ON and OFF by the blanking electrode 64 and the selector aperture 70 through the blanking drive circuit 26. The electron beam b that has passed through the opening 70a of the selector aperture 70 to be incident on the objective lens 76 is deflected by the electrostatic deflection electrode 74 in the X direction or the Y direction according to the information to be written. Thus, the spot position on the surface of the sample S is controlled. That is, the electron beam b scans on the surface (the X-Y plane) of the sample S to write information on predetermined positions of the surface of the sample S.

The following describes the configuration of the focal position control part 21. The focal position control part 21 calculates a correction voltage (correction amount) for controlling the focal position of the electron beam b according to the position of the mobile body 45 (turntable 53) detected by the position sensor 47 and the magnetic flux density information (magnetic information) on each position of the mobile body 45 acquired by the magnetic detector 36. Based on this correction voltage, the focal position control part 21 causes the electrostatic lens 78 to adjust the focal position of the electron beam b to an appropriate position.

Figure 3:
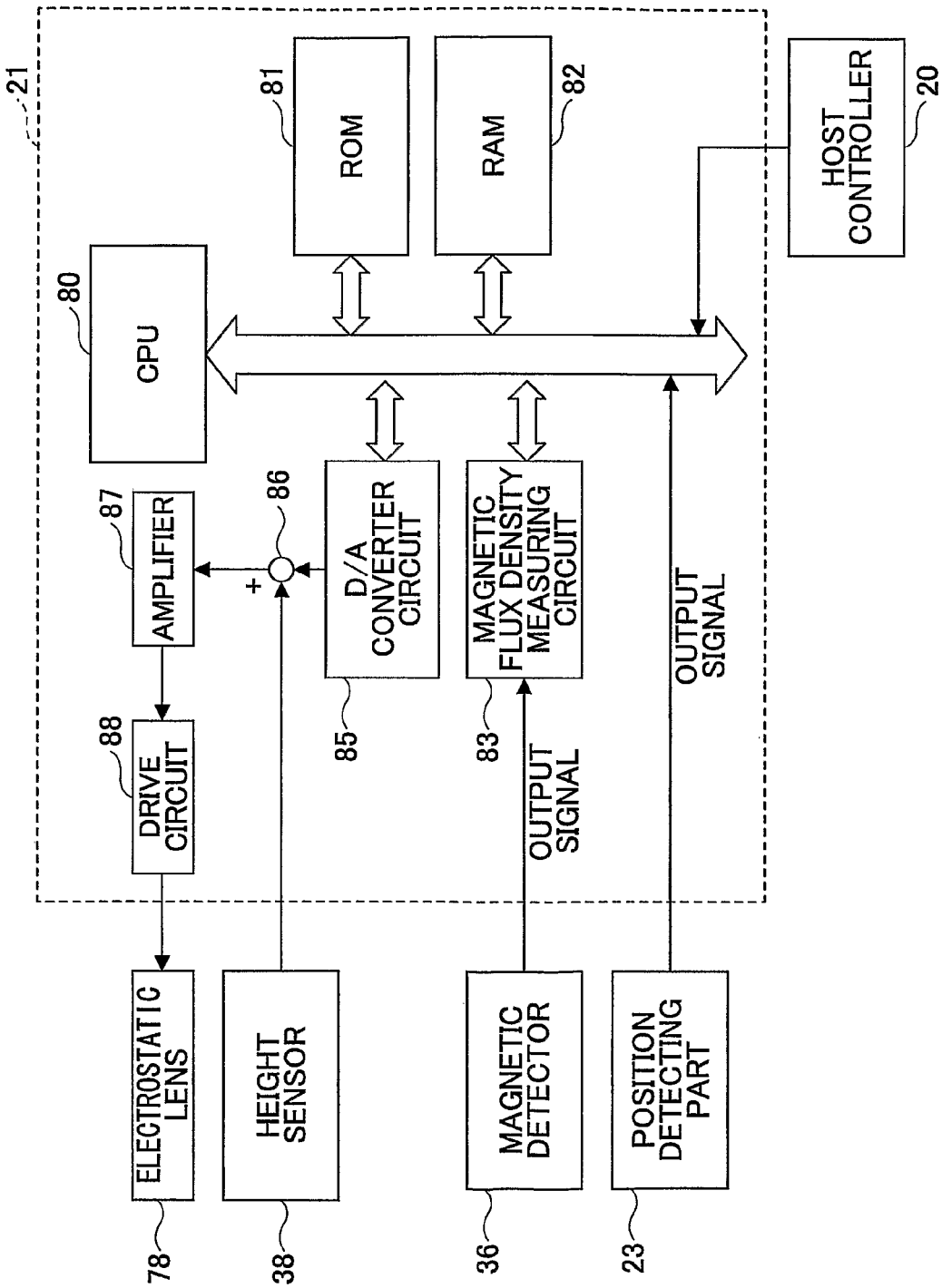
FIG. 3 is a block diagram showing a structure of a focal position control part of the electron beam recording apparatus according to the first embodiment of the present invention.

FIG. 3 is a block diagram showing a structure of the focal position control part 21 according to the present embodiment.

Referring to FIG. 3, the focal position control part 21 includes a CPU 80, a ROM 81 with a program written therein for computing a convergence position characteristic arithmetic expression, a RAM 82, a magnetic flux density measuring circuit 83, a D/A converter circuit 85, an adder 86, an amplifier 87, and a drive circuit 88.

The CPU 80 is connected through a bus to the ROM 81, the RAM 82, the magnetic flux density measuring circuit 83, the D/A converter circuit 85, the host controller 20, and the position detecting part 23 (position sensor 47).

The CPU 80 reads out the computation program for a convergence position characteristic arithmetic expression from the ROM 81, and computes a convergence position characteristic arithmetic expression according to the output signal of the position detecting part 23 (position sensor 47) and the magnetic flux density information of each position of the mobile body 45 by using the computation program for a convergence position characteristic arithmetic expression. The convergence position characteristic arithmetic expression is a high-order polynomial such as, e.g., a quintic function. The CPU 80 calculates coefficients of the high-order polynomial.

The magnetic flux density measuring circuit 83 measures the magnetic flux density in, e.g., the Z direction based on the output signal of the magnetic detector 36.

The RAM 82 holds the coefficients of the convergence position characteristic arithmetic expression (high-order polynomial) calculated by the CPU 80.

The D/A converter circuit 85 converts digital applied voltage data for the electrostatic lens 78, which is calculated by the CPU 80, into analog voltage data.

In the focal position control part 21, the D/A converter circuit 85 is connected to the adder 86. The adder 86 is connected to the amplifier 87, and the amplifier 87 is connected to the drive circuit 88.

The adder 86 adds the analog voltage data (output signal) of the D/A converter circuit 85 to the output signal of the height sensor 38 representing the surface height of the sample S, and outputs an addition signal.

The amplifier 87 amplifies, with a predetermined amplification factor, the addition signal of the adder 86 to the level necessary for the electrostatic lens 78. The drive circuit 88 is connected to the electrostatic lens 78. The focal length of the electrostatic lens 78 is changed by an output signal (correction voltage) of the drive circuit 88, so that the focal point of the electrostatic lens 78 is adjusted to focus the electron beam b onto the surface of the sample S.

The following describes a method of controlling the focal point of the electron beam b in the electron beam generator 14. First, with reference to FIG. 4, the focal position of the electron beam b affected by a magnetic field $B_Z$ is described.

Figure 4:
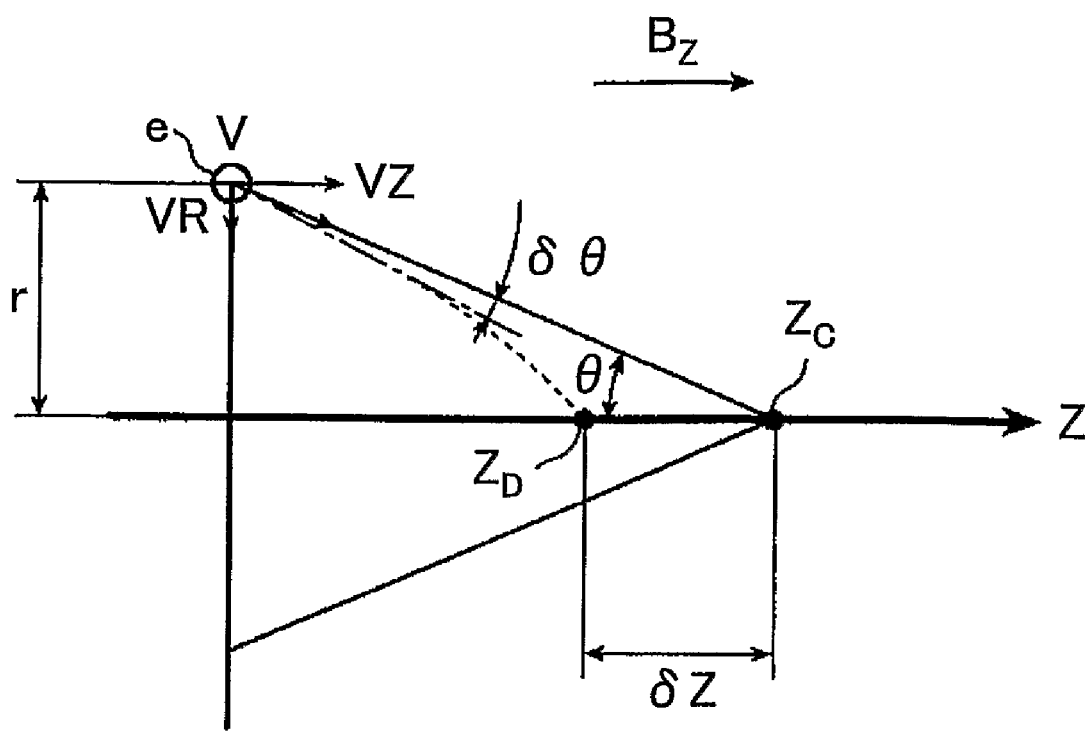
FIG. 4 is a schematic diagram illustrating the convergence position of an electron beam.

FIG. 4 shows an electron beam flow of a convergence half angle $\theta$ relative to a Z axis representing the focus direction (the Z direction). An electron e with a velocity of V starts rotating about the Z axis in response to Lorentz force due to a velocity component VR and a magnetic field $B_Z$. As the velocity component VR is proportional to the convergence half angle $\theta$ ($\theta \ll 1$), the Lorentz force is proportional to a distance r from the Z axis. The rotating electron e receives a force in a direction perpendicular to the Z axis due to the magnetic field $B_Z$, so that a $\delta\theta$ orbital is bent. The $\delta\theta$ is proportional to the electron beam diameter R and converges onto a convergence point $Z_C$. A convergence point $Z_D$ of the entire electron beam flow is uniformly displaced by a displacement amount $\delta Z$ in the focus direction (the Z direction).

Accordingly, if the magnitude of the electric field, i.e., the magnetic flux density is known, the displace amount $\delta Z$ in each position can be calculated by integrating in the radial direction and the Z direction.

The following describes correction of the displacement amount of the convergence point of the electron beam b.

Figure 5:
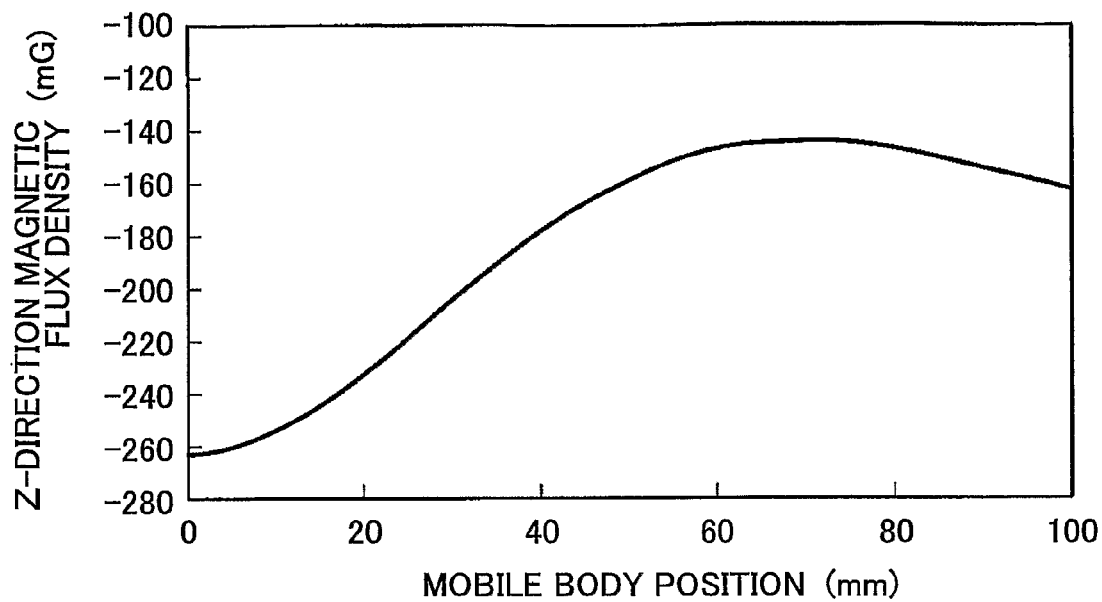
FIG. 5 is a graph showing a characteristic curve of magnetic flux density in the Z direction with respect to mobile body position, where the vertical axis represents the magnetic flux density in the Z direction and the horizontal axis represents the mobile body position.

FIG. 5 is a graph showing a characteristic curve of magnetic flux density in the Z direction with respect to mobile body position, where the vertical axis represents the magnetic flux density in the Z direction and the horizontal axis represents the mobile body position. The curve shown in FIG. 5 representing the Z-direction magnetic flux density in each position of the mobile body 45 is referred to as a characteristic curve.

The mobile body position indicates the position of the turntable 53 in the X direction with reference to the position of the rotational center of the turntable 53 (rotating mechanism unit 34) on which the electron beam b is irradiated when not affected by a magnetic field (i.e., X=0 mm).

Figure 6:
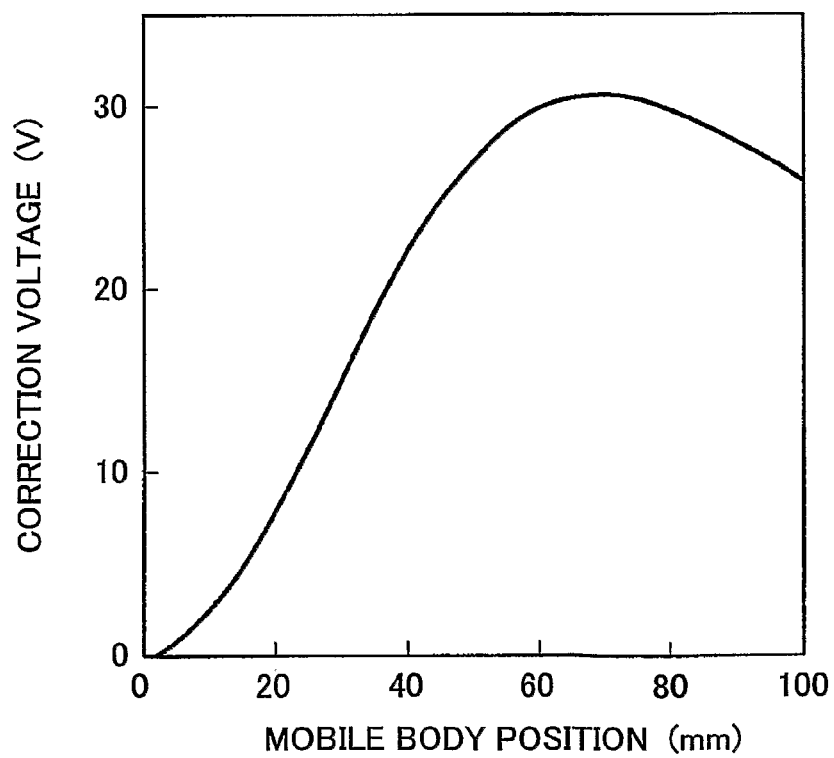
FIG. 6 is a graph showing a convergence position characteristic of an electron beam with respect to mobile body position, where the vertical axis represents correction voltage and the horizontal axis represents the mobile body position.

In this embodiment, the magnetic flux density of the characteristic curve shown in FIG. 5 is integrated in the radial direction and the Z direction, thereby calculating the correction voltage to the electrostatic lens 78 for each position of the mobile body 45 as shown in FIG. 6. This correction voltage is to be applied from the drive circuit 88 to the electrostatic lens 78.

Figure 7:
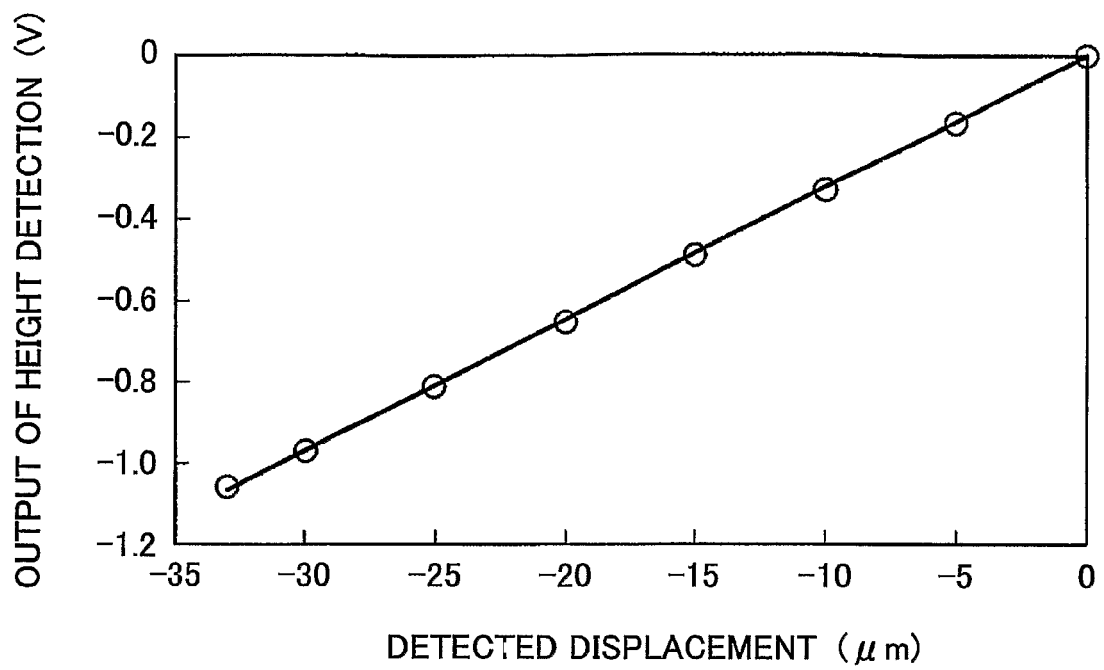
FIG. 7 is a graph showing a sensitivity characteristic of a height sensor, where the vertical axis represents output of height detection and the horizontal axis represents detected displacement.
Figure 8:
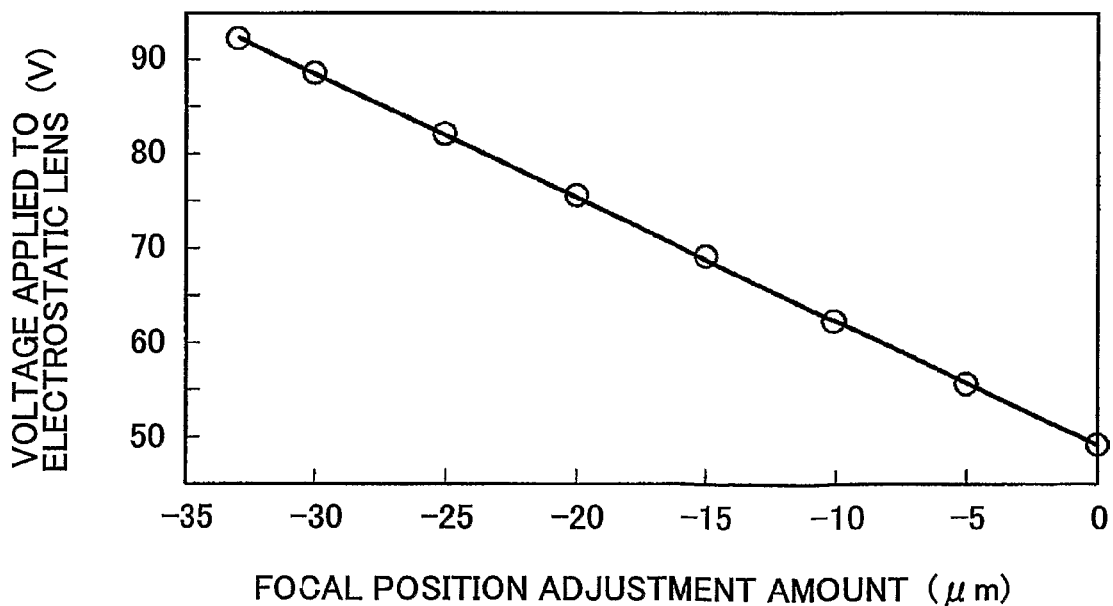
FIG. 8 is a graph showing a sensitivity characteristic of an electrostatic lens, where the vertical axis represents voltage applied to an electrostatic lens and the horizontal axis represents focal position adjustment amount.

It is to be noted that, in this embodiment, for calculation of the correction voltage (voltage to be applied to the electrostatic lens 78) by the focal position control part 21, height detection sensitivity of the height sensor 38 shown in FIG. 7 and sensitivity of the electrostatic lens 78 shown in FIG. 8 are measured in advance.

Further, in this embodiment, because the influence of the magnetic field varies depending on the position of the mobile body 45, the correction voltage needs to be changed depending on the position of the mobile body 45. Therefore, the focal position control part 21 successively calculates the correction voltage based on the mobile body position information.

For example, the RAM 82 holds coefficients of polynomial approximation (a function of the mobile body position) by which the characteristic shown in FIG. 6 is approximated. With the polynomial approximation, a correction voltage corresponding to the present mobile position information is calculated. The calculation of the correction voltage is performed by the CPU 80 by reading out coefficient data of the coefficients from the RAM 82 according to the calculation program read out from the ROM 81 and using output data of the position detecting part 23. The calculation result is output to the D/A converter circuit 85. If the amplification factor of the amplifier 87 is 1, the correction voltage shown in FIG. 6 is output from the D/A converter circuit 85 to the amplifier 87. If the amplification factor of the amplifier 87 is 10, $\frac{1}{10}$ of the correction voltage shown in FIG. 6 is output from the D/A converter circuit 85 to the amplifier 87.

In the electron beam generator 14 of the electron beam recording apparatus 10 of this embodiment, when the amount of a current of the electron source 62 required for recording into (printing onto) the sample S is determined, the magnetic detector 36 is moved to the vicinity of a work distance position on the irradiation axis C of the electron beam b before recording is performed. Thus, the magnetic detector 36 measures magnetic flux density in the Z direction of each mobile body position so as to compute the convergence position characteristic (see FIG. 6).

When recording (printing) is performed, the adder 86 adds the output signal corresponding to the amount of focal position displacement due to the magnetic field to the output signal of the height sensor 38, and a voltage is applied through the amplifier 87 and the drive circuit 88 to the electrostatic lens 78. Thus the electrostatic lens 78 controls the focal point of the electron beam b. In this focal control of the electron beam b, since influence of the magnetic field is reduced, the electric beam b can be irradiated onto a predetermined position of the sample S with high focal position accuracy so as to record information. Moreover, due to high focal position accuracy of the electron beam b, the printing pattern can be recorded on the sample S with high shape accuracy.

A second embodiment of the present invention is described below.

Figure 9:
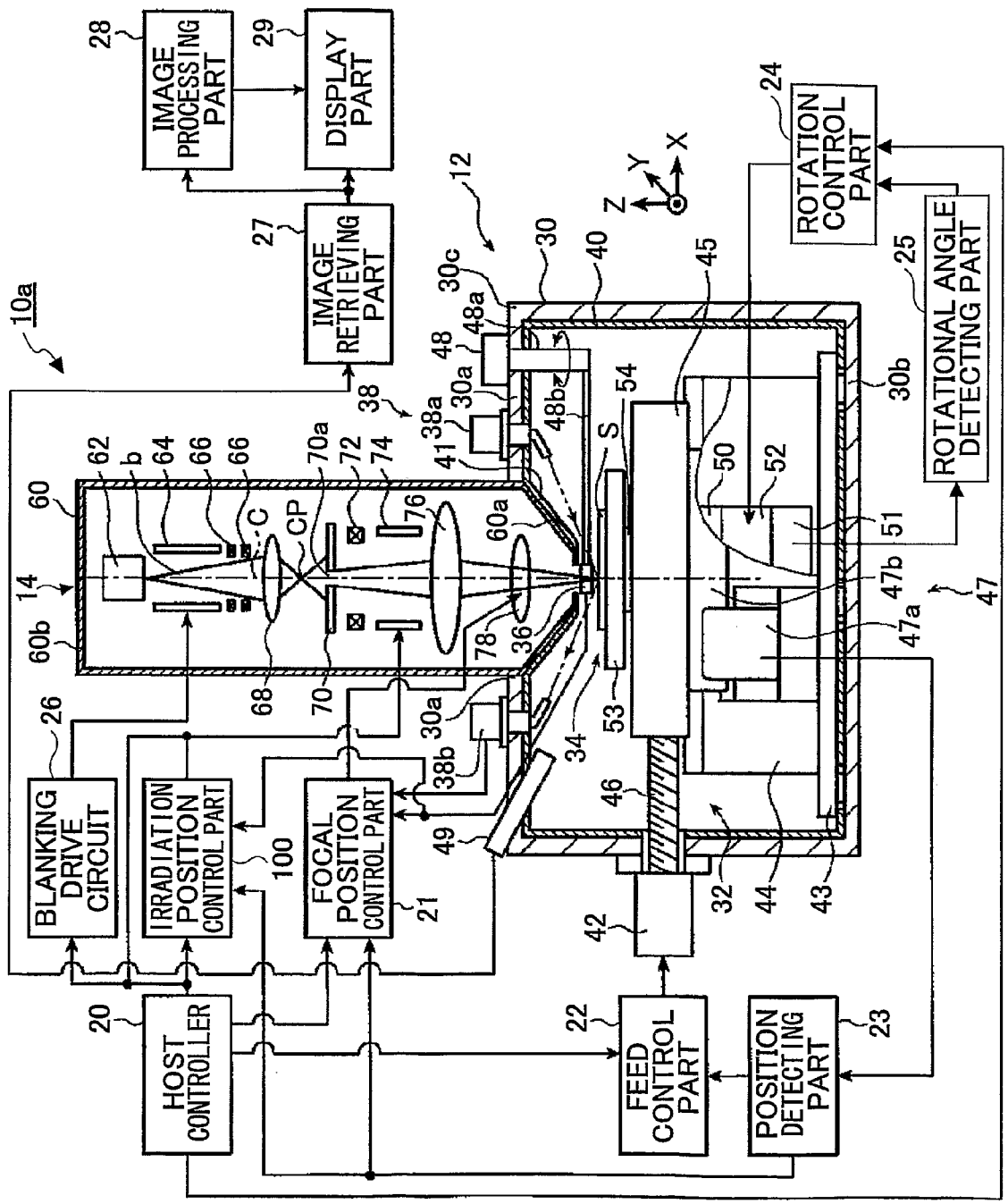
FIG. 9 is a schematic diagram showing an electron beam recording apparatus according to a second embodiment of the present invention.
Figure 10:
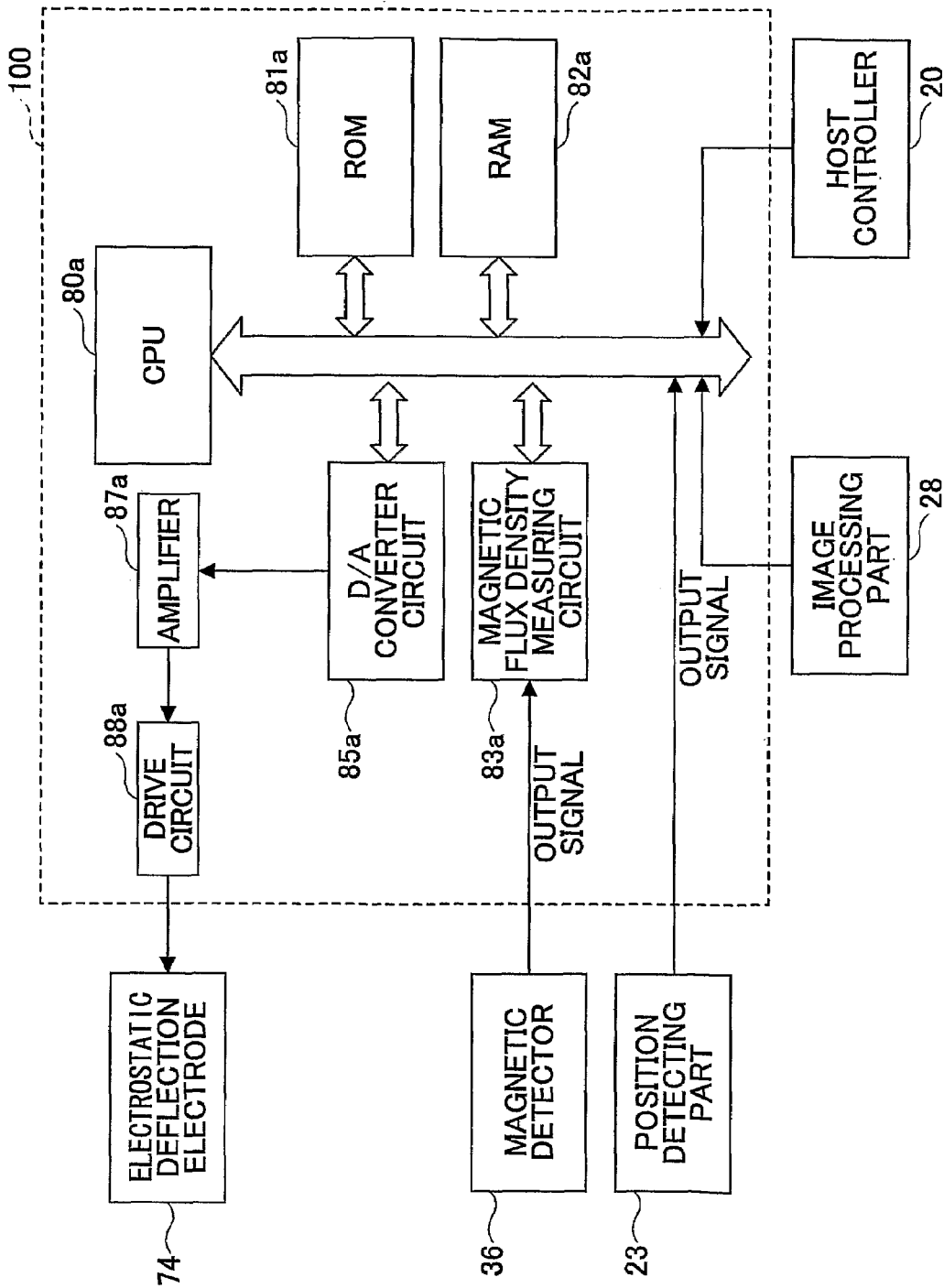
FIG. 10 is a block diagram showing a structure of an irradiation position control part of the electron beam recording apparatus according to the second embodiment of the present invention.
Figure 11:
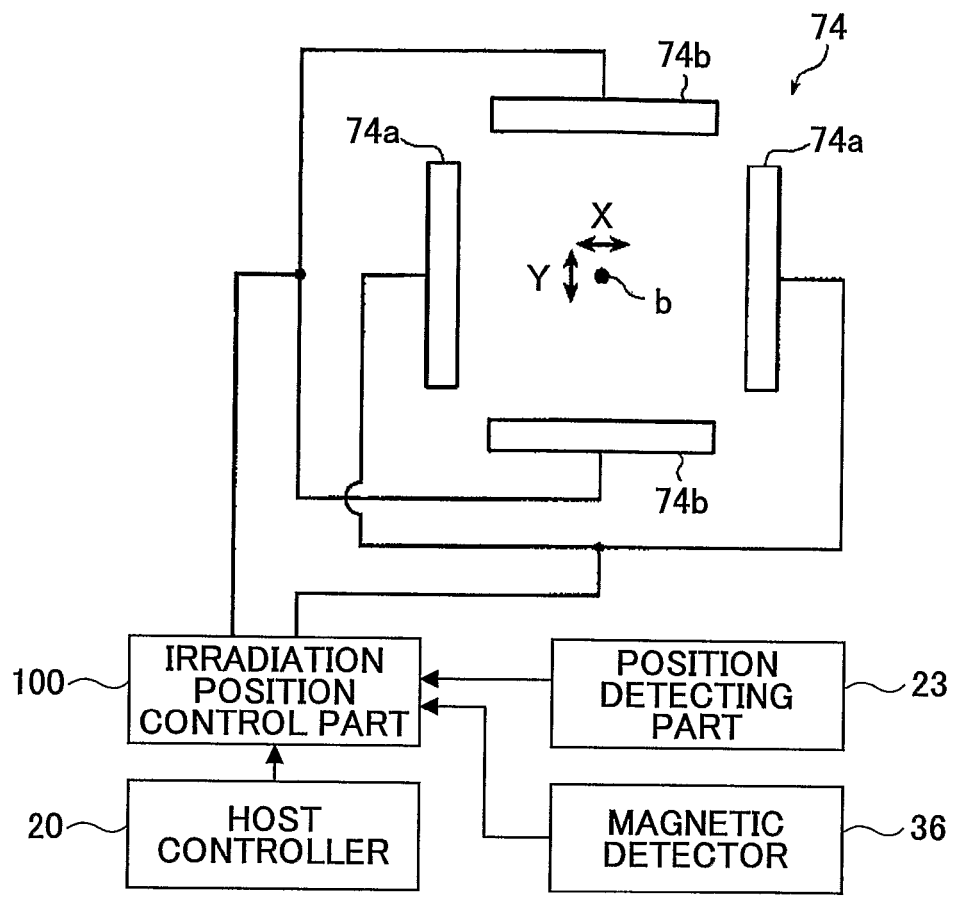
FIG. 11 is a schematic diagram showing a structure of an electrostatic deflection electrode of the electron beam recording apparatus according to the second embodiment of the present invention.

FIG. 9 is a schematic diagram showing an electron beam recording apparatus 10a according to the second embodiment of the present invention. FIG. 10 is a block diagram showing a structure of an irradiation position control part 100 of the electron beam recording apparatus 10a according to the second embodiment of the present invention. FIG. 11 is a schematic diagram showing a structure of an electrostatic deflection electrode 74 of the electron beam recording apparatus according to the second embodiment of the present invention. Component parts of the electron beam recording apparatus 10a identical to those of the electron beam recording apparatus 10 of the first embodiment of the present invention shown in FIGS. 1 through 8 are denoted by the same reference numerals and are not described in detail.

The electron beam recording apparatus 10a of the second embodiment is different from the electron beam recording apparatus 10 (see FIG. 1) of the first embodiment in being able to adjust the irradiation position (convergence position) of the electron beam b in the X direction and the Y direction in addition to being able to adjust the focal position (convergence position) of the electron beam b.

The electron beam recording apparatus 10a of this embodiment has a function of adjusting displacement of the irradiation position in the X direction and the Y direction in addition to the function of the electron beam recording apparatus 10 of the first embodiment of correcting the displacement of the focal position (defocus).

The inventor of this invention has found that the focal position displacement and the irradiation position displacement in the X direction and the Y direction occur independently from each other, and that the focal position displacement and the irradiation position displacement can be corrected without being affected by each other even if the corrections are separately conducted. Accordingly, correction of the focal position displacement and correction of the irradiation position displacement may be performed in any order.

Referring to FIG. 9, the electron beam recording apparatus 10a of the second embodiment is different from the electron beam recording apparatus 10 (see FIG. 1) of the first embodiment also in having a secondary electron detector 49 in the vacuum chamber 30, an image retrieving part 27 for forming an image based on a signal output from the secondary electron detector 49 when the electron beam b scans on the X-Y plane, an image processing part 28 for processing the image formed by the image retrieving part 27, a display part for displaying an image, and the irradiation position control part (convergence position control part) 100 for controlling the irradiation position of the electron beam b. Except for these differences, the configuration of the electron beam recording apparatus 10a is the same as the configuration of the electron beam recording apparatus 10 (see FIG. 1) of the first embodiment, and is not described in detail.

The irradiation position control part 100 of the electron beam recording apparatus 10a of this embodiment calculates a correction amount for correcting the irradiation position of the electron beam b in at least one of the X direction and the Y direction that are orthogonal to each other, calculates a correction voltage (correction amount) for controlling the irradiation position of at least one of the X direction and the Y direction, and adjusting the irradiation position of the electron beam b on the surface of the sample S using the electrostatic deflection electrode 74 in at least one of the X direction and the Y direction.

The irradiation control part 100 is able to correct the irradiation position when the host controller 20 performs scanning of the electron beam b on the surface of the sample S in the X-Y plane.

The secondary electron detector 49 detects secondary electrons generated when the electron beam b scans on the surface of the sample S in the X-Y plane.

The image retrieving part 27 forms a secondary electron reflection image based on the detection result of the secondary electrons by the secondary electron detector 49.

In the electron beam recording apparatus 10a of this embodiment, the host controller 20 scans the electron beam b on the surface of the sample S in the X-Y plane. The secondary electron detector 49 detects the secondary electrons generated when the scanning is performed. The image retrieving part 27 forms the secondary electron reflection image. Then, the display part 29 displays the secondary electron reflection image.

The image processing part 28 has a length measuring function of measuring the distance of a subject of the secondary electron reflection image displayed on the display part 29.

The image processing part 28 executes image processing and calculates, as described below, a displacement amount of the convergence point and a displacement amount of the irradiation position in the X direction and the Y direction. Image processing results (the displacement amount of the convergence point and the displacement amount of the irradiation position in the X and Y directions) of the image processing part 28 can be output to the display part 29 so as to be displayed thereon.

The image processing result (the displacement amount of the convergence point) of the image processing part 28 is output to the focal position control part 21, as described below, so that a correction amount is calculated so as to relocate the focal position for achieving accurate focus.

The image processing result (the irradiation position displacement amount) of the image processing part 28 is output to the irradiation position control part 100, as described below, so that a correction amount is calculated so as to locate the irradiation position to an appropriate position.

The irradiation position control part 100 calculates a correction voltage for controlling the irradiation position of the electron beam b according to the position of the mobile body 45 (turntable 53) detected by the position sensor 47 and the X-direction magnetic flux density information (magnetic information) and the Y-direction magnetic flux density information (magnetic information) on each position of the mobile body 45 acquired by the magnetic detector 36. The irradiation position control part 100 adds this correction voltage to a voltage to be applied for deflection from the host controller 20 so as to adjust the irradiation position of the electron beam b to an appropriate position.

Referring to FIG. 10, the irradiation position control part 100 is different from the focal position control part 21 (see FIG. 3) in not being connected to the height sensor 38, not having the adder 86, and having a ROM 81a with a program written thereon for computing an irradiation position characteristic arithmetic expression. Except for these differences, the configuration of the irradiation position control part 100 is generally the same as the configuration of the focal position control part 21.

In the irradiation position control part 100, as in the focal position control part 21, a CPU 80a is connected through a bus to the ROM 81a, a RAM 82a, a magnetic flux density measuring circuit 83a, a D/A converter circuit 85a, the position detecting part 23 (position sensor 47), and the image processing part 28.

The CPU 80a reads out the computation program for an irradiation position characteristic arithmetic expression from the ROM 81a, and computes an irradiation position characteristic arithmetic expression according to the output signal of the position detecting part 23 (position sensor 47) and the magnetic flux density information of each position of the mobile body 45 in the X direction and the Y direction by using the computation program for an irradiation position characteristic arithmetic expression. The irradiation position characteristic arithmetic expression is a high-order polynomial such as, e.g., a quintic function. The CPU 80a calculates coefficients of the high-order polynomial.

The magnetic flux density measuring circuit 83a measures, e.g., magnetic flux density in the Z direction and magnetic flux density in the Y direction based on the output signal of the magnetic detector 36.

The RAM 82a holds the coefficients of the irradiation position characteristic arithmetic expression (high-order polynomial) calculated by the CPU 80a.

Further, a correction digital voltage to be applied to the electrostatic deflection electrode 74 (a pair of first deflection electrode plates 74a and a pair of second deflection electrode plates 74b) necessary for correcting the irradiation position calculated by the CPU 80a is converted to a predetermined analog correction voltage by the D/A converter circuit 85a.

In the irradiation position control part 100, the D/A converter circuit 85a is connected to the amplifier 87a. The amplifier 87a is connected to a drive circuit 88a.

The amplifier 87a amplifies, with a predetermined amplification factor, the correction voltage (analog voltage) to the level required by the electrostatic deflection electrode 74.

The drive circuit 88a is connected to the electrostatic deflection electrode 74. An output signal (correction voltage) of the drive circuit 88a changes the irradiation position of the electron beam b of the electrostatic deflection electrode 74, so that the irradiation position of the electron beam b is adjusted. Thus the electron beam b is focused onto a predetermined irradiation position on the surface of the sample S if not affected by a magnetic field.

In the electron beam recording apparatus 10a of this embodiment, when the host controller 20 deflects the electron beam b, the irradiation position control part 100 corrects the irradiation position. As for the focal position, the focal position control part 21 controls the focal position so as to focus the electron beam b onto the surface of the sample S as in the first embodiment.

The following describes a focal position controlling method of the electron beam recording apparatus 10a of this embodiment.

The focal position controlling method of the electron beam recording apparatus 10a of this embodiment is different from that of the electron beam recording apparatus 10 of the first embodiment only in inspecting for focal position displacement using naked eyes and is not described in detail.

Figure 12A:
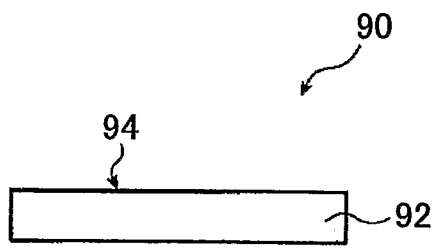
FIG. 12A is a side elevational view schematically showing a test substrate.
Figure 12B:
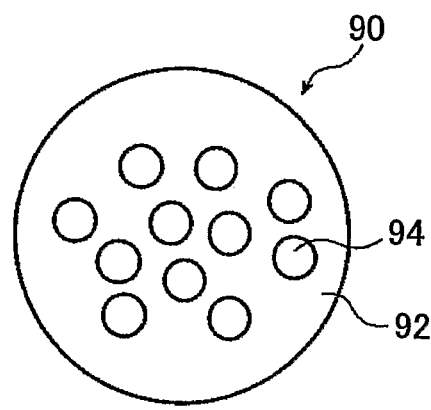
FIG. 12B is a plan view schematically showing the test substrate of FIG. 12A.
Figure 13:
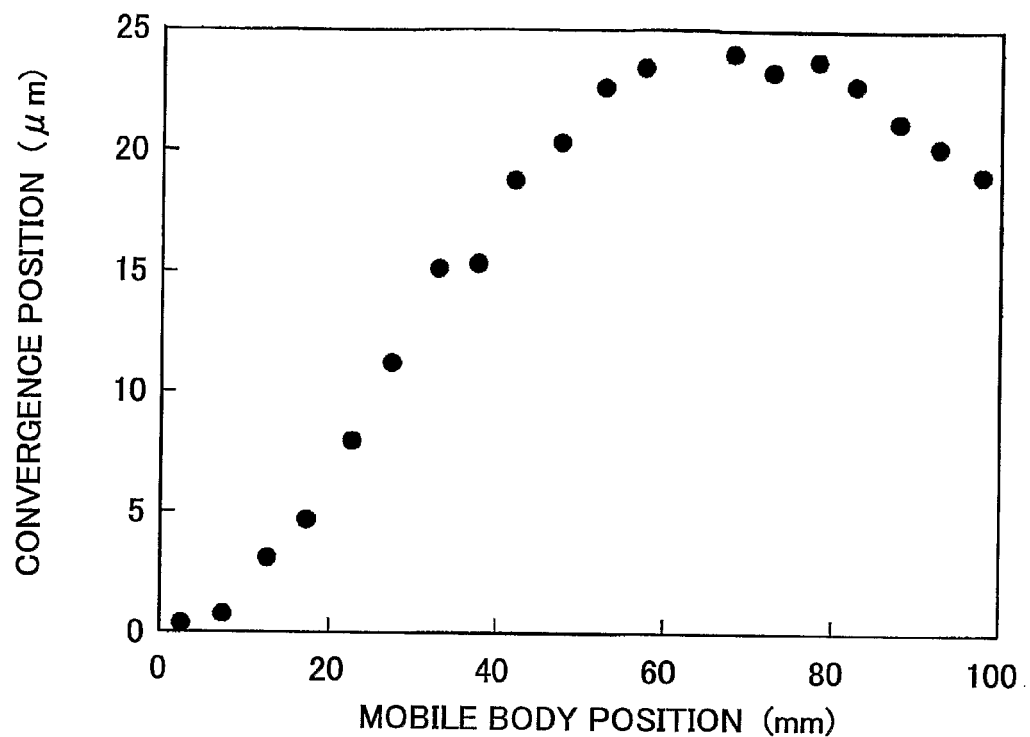
FIG. 13 is a graph showing a convergence position characteristic of an electron beam with respect to mobile body position, where the vertical axis represents the convergence position and the horizontal axis represents the mobile body position.

FIG. 12A is a side elevational view schematically showing a test substrate 90, and the FIG. 12B is a plan view schematically showing the test substrate 90 of FIG. 12A. FIG. 13 is a graph showing a convergence position characteristic of the electron beam b with respect to the position of the mobile body 45, where the vertical axis represents the convergence position and the horizontal axis represents the mobile body position.

With reference to FIGS. 12A and 12B, according to the focal position controlling method of the electron beam recording apparatus 10a of this embodiment, the test substrate 90 that is used has a tabular base 92 on which particles 94, such as e.g., gold particles and latex spheres, with diameters of about tens of nanometers through hundreds of nanometers are supplied.

According to the focal position controlling method of the electron beam recording apparatus 10a of this embodiment, the host controller 20 scans the electron beam b on the surface of the test substrate 90 in the X-Y plane by using the electrostatic deflection electrode 74. The secondary electron detector 49 detects the secondary electrons generated when the scanning is performed. The image retrieving part 27 forms a secondary electron reflection image based on the detection result of the secondary electron detector 49. Then, the display part 29 displays the secondary electron reflection image. The focal position displacement (defocus) due to the magnetic field on each position of the turntable 53 (the rotating mechanism unit 34) is inspected with naked eyes using the secondary electron reflection image displayed on the display part 29, and the focal position is adjusted for achieving accurate focus by manually applying a voltage to the electrostatic lens 78. The voltage applied for achieving accurate focus is obtained as focal position adjustment information (defocus amount). Then, a convergence position characteristic of the electron beam b shown in FIG. 13 is computed. The focal position control part 21 calculates a correction voltage based on the convergence position characteristic of the electron beam b. Based on the correction voltage, the focal length of the electrostatic lens 78 is adjusted, so that the focal position of the electron beam b relative to the surface of the sample S is adjusted. Thus, the focal position of the electron beam b is relocated to an appropriate position.

In the electron beam recording apparatus 10a of this embodiment, the turntable 53 is moved to a position of X=0 mm, and the focus of the electron beam b is adjusted to the particles 94.

Then, a convergence position, i.e., a defocus amount (the voltage applied for achieving accurate focus) of each particle 94 on the surface of the base 92 is calculated. An approximate expression is computed using the calculated defocus amounts and then written into the ROM 81 as a program.

According to the electron beam recording apparatus 10a of this embodiment, it is preferable that the ROM 81 of the focal position control part 21 be a flash ROM or the like so that coefficient data of the convergence position characteristic computed by calculating the defocus amount be written at the time of, for example, recording (exposure) onto the sample S. The focal position control part 21 may have an input part so that the coefficients of the approximate expression are input by the input part.

The following describes a method of controlling the irradiation position of the electron beam b in the electron beam irradiation device 14 of the electron beam recording apparatus 10a of this embodiment.

Figure 14:
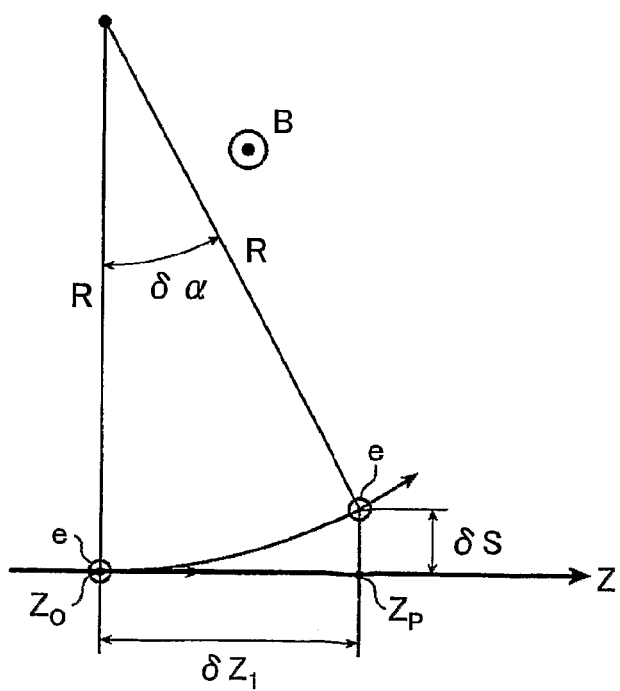
FIG. 14 is a schematic diagram illustrating displacement of irradiation position of an electron beam.

First, with reference to FIG. 14, displacement of the irradiation position of the electron beam b affected by a magnetic field B is described.

Referring to FIG. 14, an electron e with a mass m accelerated at an accelerating voltage Va passes through a deflection magnetic field area with a magnetic flux density B. In this case, the expression $R=(2m \cdot Va/e)^{1/2} \times 1/B$ is satisfied, where R represents cyclotron radius.

The electron e is deviated from the Z axis by a displacement amount $\delta S$ when moved a distance $\delta Z_1$ from a position $Z_O$ to a position $Z_p$.

The relationship between the distance $\delta Z_1$ and the displacement amount $\delta S$ is represented by the following expression according to a geometric relationship:

$$\delta S = (\delta Z_1)^2 / 2R.$$

Based on the cyclotron radius R and the relationship between $\delta Z_1$ and the displacement amount $\delta S$, the displacement amount $\delta S$ is represented by the following expression:

$$\delta S = ((\delta Z_1)^2 \times B)/(2 \cdot (2m \cdot Va/e)^{1/2}).$$

Accordingly, if the magnetic flux density distribution is known, the displacement amount $\delta S$ of the irradiation position of the electron beam b is determined by integrating in the Z direction.

The following describes correction of the displacement amount of the irradiation position of the electron beam b.

Figure 15:
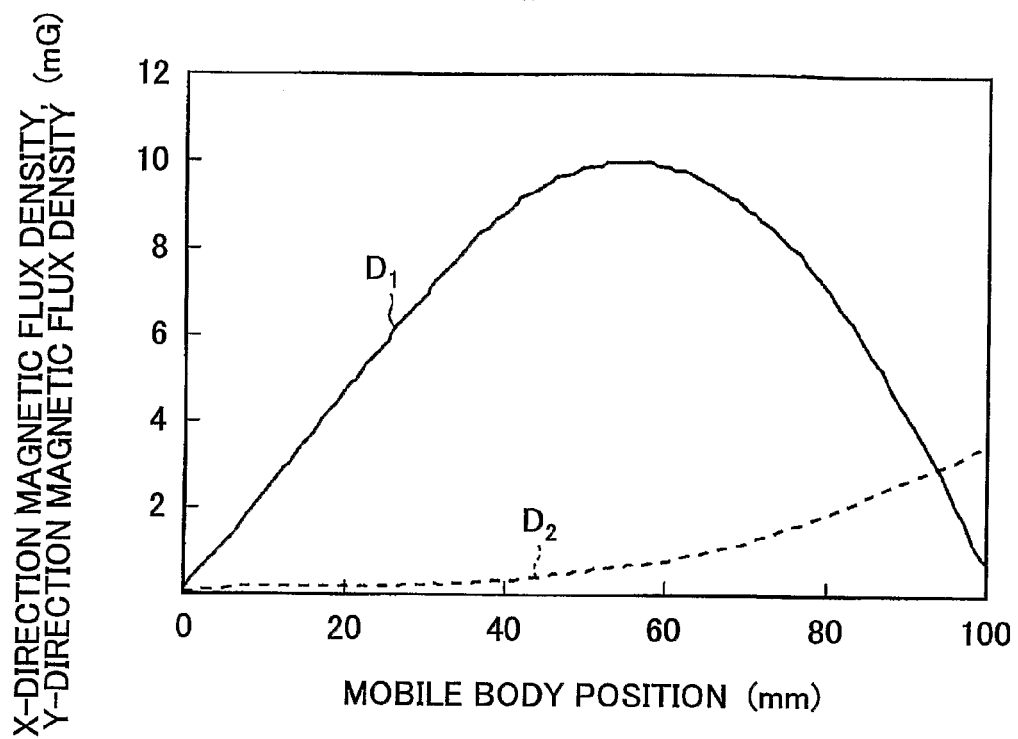
FIG. 15 is a graph showing characteristic curves of magnetic flux densities in the X direction and the Y direction with respect to mobile body position, where the vertical axis represents the magnetic flux density in the X direction and the Y direction and the horizontal axis represents the mobile body position.

FIG. 15 is a graph showing a characteristic curve of magnetic flux density in the X direction and the Y direction with respect to mobile body position, where the vertical axis represents the magnetic flux density in the X direction and the Y direction and the horizontal axis represents the mobile body position. In FIG. 15, a curve representing the X-direction magnetic flux density on each position of the mobile body 45 is referred to as a characteristic curve $D_1$, and a curve representing the Y-direction magnetic flux density is referred to as a characteristic curve $D_2$.

The mobile body position indicates the position of the turntable 53 in the X direction with reference to the position of the rotational center of the turntable 53 (rotating mechanism unit 34) on which the electron beam b is irradiated (i.e., X=0 mm).

Figure 16:
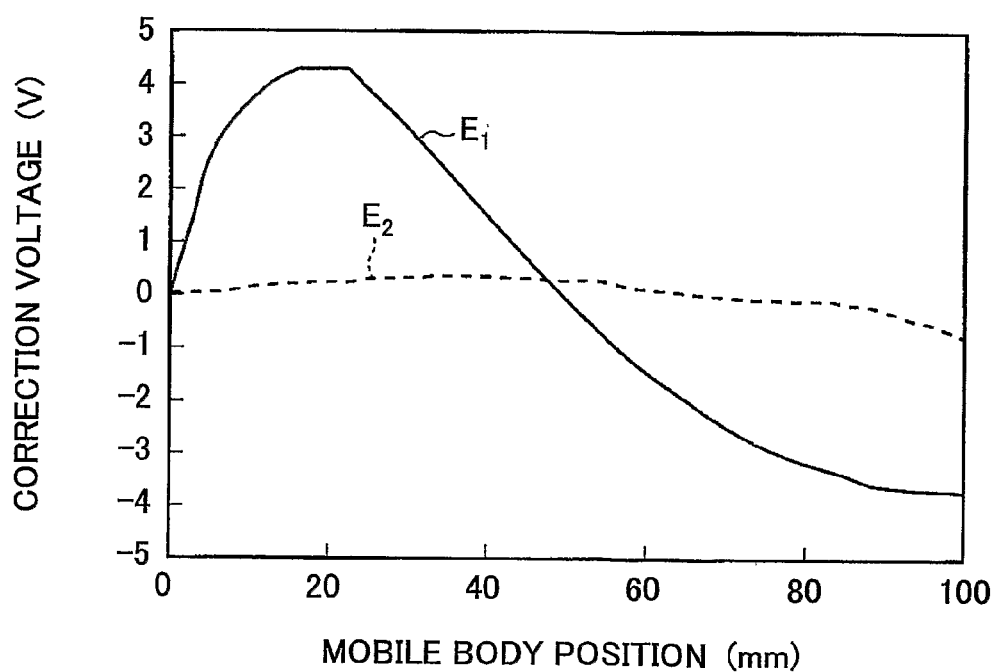
FIG. 16 is a graph showing an irradiation position characteristic of an electron beam with respect to mobile body position, where the vertical axis represents correction voltage and the horizontal axis represents the mobile body position.

In this embodiment, the magnetic flux densities of the characteristic curves $D_1$ and $D_2$ shown in FIG. 15 are integrated in the Z direction, thereby calculating the correction voltage to the electrostatic deflection electrode 74 for each position of the mobile body 45 as shown in FIG. 16. This correction voltage is to be applied from the drive circuit 88a to the electrostatic deflection electrode 74. It is to be noted that the turntable 53 is stopped when calculating the correction voltage for the irradiation position.

In this embodiment, for calculation of the correction voltage (the voltage to be applied to the electrostatic deflection electrode 74 (the first deflection electrode plates 74a and the second deflection electrode plates 74b)) by the irradiation position control part 100, sensitivity of the electrostatic deflection electrode 74 (the first deflection electrode plates 74a and the second deflection electrode plates 74b) is measured in advance. In this embodiment, the sensitivity of the electrostatic deflection electrode 74 (the first deflection electrode plates 74a and the second deflection electrode plates 74b) is, e.g., in a range of 1 through 5 μm/V.

Further, in this embodiment, because the influence of the magnetic field on the displacement of the irradiation position varies depending on the position of the mobile body 45, the correction voltage for the electrostatic deflection electrode 74 (the first deflection electrode plates 74a and the second deflection electrode plates 74b) needs to be changed depending on the position of the mobile body 45. Therefore, the focal position control part 21 successively calculates the correction voltage for the electrostatic deflection electrode 74 (the first deflection electrode plates 74a and the second deflection electrode plates 74b) based on the mobile body position information. For example, the RAM 82a holds coefficients of polynomial approximation (a function of the mobile body position) by which the characteristic shown in FIG. 16 is approximated. With the polynomial approximation, an irradiation position correction voltage corresponding to the present mobile position information is calculated. The calculation of the irradiation position correction voltage is performed by the CPU 80a by reading out coefficient data of the coefficients from the RAM 82a according to the calculation program read out from the ROM 81a and using output data of the position detecting part 23. The calculation result is output to the D/A converter circuit 85a. If the amplification factor of the amplifier 87a is 1, the correction voltage shown in FIG. 16 is output from the D/A converter circuit 85a to the amplifier 87a. If the amplification factor of the amplifier 87a is 10, 1/10 of the correction voltage shown in FIG. 16 is output from the D/A converter circuit 85a to the amplifier 87a. Thus the displacement of the irradiation position of the electron beam b is corrected.

With the irradiation position controlling method of the electron beam recording apparatus 10a of this embodiment, the irradiation position of the electron beam b can be corrected not only in the above described manner but also by using the secondary electron reflection image displayed on the display part 29.

For correction using the secondary electron reflection image, a fixed stage (not shown) is hung from an opening of the tip end portion 60a of the lens barrel 60, and the test substrate 90 is placed on the fixed stage.

Then, the host controller 20 scans the electron beam b on the surface of the test substrate 90 in the X-Y plane by using the electrostatic deflection electrode 74. The secondary electron detector 49 detects a secondary electron when the scanning is performed. The image retrieving part 27 forms a secondary electron reflection image. Then, the display part 29 displays the secondary electron reflection image.

The positions of the particles 94 of the test substrate 90 are estimated in advance. The positions of the particles 94 of the test substrate 90 and the position of the particles in the secondary electron reflection image displayed on the display part 29 are compared so as to measure positional shifts of the particles 94 using the length measuring function of the image processing part 28.

Irradiation position displacement due to the magnetic field on each position of the turntable 53 (the rotating mechanism unit 34) is inspected with naked eyes using the length measuring function of the image processing part 28. Then, a voltage is manually applied to the electrostatic deflection electrode 74. The irradiation position is adjusted to an appropriate position such that the particles appear in the secondary electron reflection image if there is no influence of the magnetic field. It is to be noted that the turntable 53 is stopped when calculating the correction voltage for the irradiation position.

Figure 17:
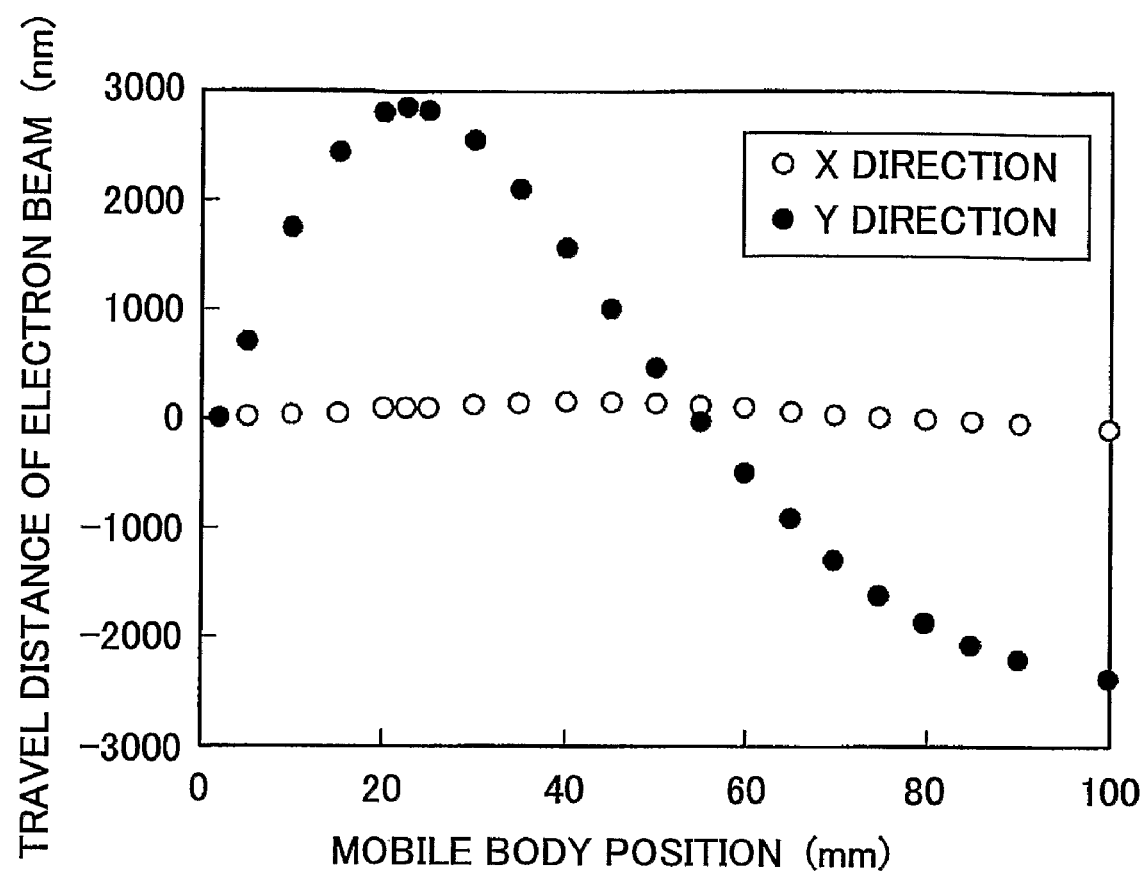
FIG. 17 is a graph showing a travel distance characteristic of an electron beam with respect to the position of a mobile body, where the vertical axis represents the travel distance of the electron beam and the horizontal axis represents the mobile body position.

The voltage applied for adjusting the irradiation position to the appropriate position is obtained as irradiation position adjustment information. Then, a travel distance characteristic of the electron beam b shown in FIG. 17 is computed. Based on the travel distance characteristic of the electron beam b, a correction voltage is computed in the irradiation position control part 100, so that the irradiation position of the electron beam b is adjusted to the appropriate irradiation position.

In the electron beam recording apparatus 10a of this embodiment, the turntable 53 is moved to a position of X=0 mm, and a secondary electron image is obtained.

Then, positional shifts of the particles 94, i.e., an irradiation position displacement amount (the voltage applied for adjusting to the appropriate irradiation position) of each particle 94 on the surface of the base 92 is calculated using the length measuring function.

The irradiation position displacement amount (the voltage applied for adjusting to the appropriate irradiation position) is successively calculated while changing the position of the turntable 53. An approximate expression is computed using the calculated irradiation position displacement amounts and then written into the ROM 81a as a program.

According to the electron beam recording apparatus 10a of this embodiment, it is preferable that the ROM 81a of the irradiation position control part 100 be a flash ROM or the like so that coefficient data of the irradiation position characteristic computed by calculating the irradiation position displacement amount be written at the time of, for example, recording (exposure) onto the sample S. The irradiation position control part 100 may have an input part so that the coefficients of the approximate expression are input by the input part.

Although the fixed stage (not shown) for the test substrate 90 hung from the opening of the tip end portion 60a is provided, the configuration is not limited thereto. For example, in an alternative embodiment, the magnetic detector 36 is used as a fixed stage. In this alternative embodiment, particles such as e.g., gold particles and latex spheres, with diameters of about tens of nanometers thorough hundreds of nanometers are supplied on the surface of the magnetic detector 36 onto which the electron beam b is to be irradiated, and a secondary electron image is observed. In another alternative embodiment, particles such as e.g., gold particles and latex spheres, with a diameter of about tens of nanometers thorough hundreds of nanometers are applied to the surface of the turntable 53 in the form of, e.g., a cross or a square, and a secondary electron image on the surface of the turntable 53 is observed.

In the second embodiment, even when the convergence position characteristic is calculated in the above described way, the same advantages as in the first embodiment are obtained. Moreover, the irradiation position in the X direction and the Y direction is corrected. Therefore, compared with the first embodiment, the electron beam b is irradiated onto a predetermined position of the sample S with high focal position accuracy and high irradiation position accuracy for recording information. Similarly, printing patterns are also recorded on the sample S at high quality. In this embodiment, since the displacement of the convergence position is experimentally computed using the test substrate 90 with the particles 94 on the surface, the electron beam recording apparatus 10 is simple and inexpensive.

As described above, according to the present invention, convergence position displacement due to the magnetic field under the point from which the laser beam b is irradiated to the sample S is calculated or experimentally calculated, so that the focal position of the electron beam b is controlled with high accuracy. Moreover, the irradiation position displacement due to the magnetic field under a point from which the laser beam b is irradiated onto the sample S is calculated or experimentally calculated, so that the irradiation position of the electron beam b is controlled with high accuracy. That is, the electron beam b is irradiated to a predetermined position of the sample S with high focal position accuracy and high irradiation position accuracy for recording information.

The focal position controlling method and the irradiation position controlling method of the electron beam recording apparatus 10a of this embodiment are not limited to the method of inspection using naked eyes. For example, the focal position controlling method and the irradiation position controlling method of the electron beam recording apparatus 10a of this embodiment may be automated by using the image processing part 28.

The following describes a second method of controlling the focus of the electron beam b in the electron beam irradiation device 14 of the electron beam recording apparatus 10a of this embodiment.

The second method of controlling the focus in the electron beam recording apparatus 10a is the same as the above-described focal position controlling method of the electron beam recording apparatus 10a except correcting focal position displacement by image processing. The second focus controlling method is therefore not described in detail.

According to the second focus controlling method, a fixed stage (not shown) is hung from an opening of the tip end portion 60a of the lens barrel 60, and a test substrate 90 is placed on the fixed stage. The test substrate 90 may be the one shown in FIG. 12A and FIG. 12B.

Then, the host controller 20 scans the electron beam b on the surface of the sample substrate 90 in the X-Y plane. The secondary electron detector 49 detects the secondary electron generated when the scanning is performed. The image retrieving part 27 forms a secondary electron reflection image based on the detection result of the secondary electron detector 49. Then, the image processing part 28 analyzes the secondary electron reflection image.

The image processing part 28 computes the size of the particles 94 in the secondary electron reflection image, and compares the computed size of the particles 94 with the size of the particles 94 measured in advance so as to calculate a focal position displacement amount (defocus amount).

Then, the size of the particles 94 in the secondary electron reflection image is calculated for each position of the turntable 53 so as to calculate a focal position displacement (defocus amount) on each position due to a magnetic field.

A voltage applied for achieving accurate focus and calculated for each position of the turntable 53 is obtained as focal position adjustment information (defocus amount). Thus the convergence position characteristic of the electron beam b is obtained. Based on the convergence position characteristic of the electron beam b, a correction voltage is computed in the focal position control part 21, so that the focal position of the electron beam b is adjusted to beat the appropriate focal position.

In the electron beam recording apparatus 10a of this embodiment, the turntable 53 is moved to a position of X=0 mm, and the focus of the electron beam b is adjusted to the particles 94.

Then, a convergence position, i.e., a defocus amount (the voltage applied for achieving accurate focus) of each particle 94 on the surface of the base 92 is calculated. An approximate expression is computed using the calculated defocus amounts and then written into the ROM 81 as a program.

The following describes a second method of controlling the irradiation position of the electron beam b in the electron beam irradiation device 14 of the electron beam recording apparatus 10a of this embodiment.

The second method of controlling the irradiation position in the electron beam recording apparatus 10a is the same as the above-described irradiation position controlling method of the electron beam recording apparatus 10a except correcting irradiation position displacement by image processing. Therefore, the second irradiation position controlling method is not described in detail.

According to the second focal position controlling method, a fixed stage (not shown) is hung from an opening of the tip end portion 60a of the lens barrel 60, and a test substrate 90 is placed on the fixed stage.

Then, the host controller 20 scans the electron beam b on the surface of the test substrate 90 in the X-Y plane. The secondary electron detector 49 detects secondary electrons when the scanning is performed. The image retrieving part 27 forms a secondary electron reflection image and outputs the image to the display part 28.

The size and position of the particles 94 of the test substrate 90 are measured in advance, and the measured size and position of the particles 94 are stored in the image processing part 28.

The image processing part 28 compares the stored size and position of the particles 94 with the position of the particles 94 in the secondary electron reflection image so as to calculate a positional shift of the particles 94.

Then, a voltage to be applied to the electrostatic deflection electrode 74 for relocating the particles 94 to the original position based on the positional shift of the particles 94, thereby calculating a correction voltage for each position. It is to be noted that the turntable 53 is stopped when calculating the correction voltage for the irradiation position.

Thus a travel distance characteristic of the electron beam b is computed. Based on the travel distance characteristic of the electron beam b, a correction voltage is computed in the irradiation position control part 100, so that the irradiation position of the electron beam b is adjusted to beat the appropriate irradiation position.

In the electron beam recording apparatus 10a of this embodiment, the turntable 53 is moved to a position of X=0 mm, and a secondary electron image is obtained.

Then, the image processing part 28 calculates a positional shift of the particles 94, i.e., an irradiation position displacement amount (the voltage applied for adjusting to the appropriate irradiation position) of each particle 94 on the surface of the base 92.

The irradiation position displacement amount (the voltage applied for adjusting to the appropriate irradiation position) is successively calculated while changing the position of the turntable 53. An approximate expression is computed using the calculated irradiation position displacement amounts and then written into the ROM 81a as a program.

The second focal position control method and the second irradiation position control method of the electron beam recording apparatus 10a of this embodiment described above achieve the same advantages as the first described methods.

While the electron beam recording apparatus of the present invention has been described in terms of preferred embodiments, it will be apparent to those skilled in the art that the present invention is not limited to the preferred embodiments illustrated herein, and variations and modifications may be made without departing from the scope of the invention.

The present application is based on Japanese Priority Application No. 2006-067977 filed on Mar. 13, 2006, and Japanese Priority Application No. 2007-005045 filed on Jan. 12, 2007, with the Japanese Patent Office, the entire contents of which are hereby incorporated by reference.

The invention claimed is:

1. An electron beam recording apparatus that records information onto the surface of a sample by using an electron beam, comprising:
   an electron source that irradiates the electron beam;
   a magnetic detector that is configured to move onto and out of an irradiation axis and acquires magnetic information on the irradiation axis;
   a convergence position control part that calculates a convergence position correction amount for correcting a convergence position of the electron beam with respect to the surface of the sample based on the magnetic information acquired by the magnetic detector; and
   a convergence position adjusting part that adjusts the convergence position of the electron beam with respect to the surface of the sample;
   wherein the convergence position control part causes the convergence position adjusting part to adjust the convergence position of the electron beam with respect to the surface of the sample based on the convergence position correction amount; and
   wherein the electron beam recording apparatus further comprises:
   a rotating mechanism unit that includes a rotatable turntable on which the sample is placed;
   a feed mechanism unit that moves the turntable of the rotating mechanism unit into a plane orthogonal to the irradiation axis of the electron beam;
   a position sensor that is provided in the feed mechanism unit and detects a position of the sample to acquire position information of the sample; and
   a height sensor that detects a height of the surface of the sample being rotated by the rotating mechanism unit and being moved by the feed mechanism unit to acquire height information of the sample; wherein
   the convergence position includes a focal position of the electron beam;
   the convergence position adjusting part adjusts the focal position of the electron beam with respect to the surface of the sample; and
   the convergence position control part calculates a focal position correction amount for correcting the focal position of the electron beam based on the magnetic field information in the direction in which the irradiation axis extends, the magnetic field information being acquired by the magnetic detector and corresponding to the height information of the sample acquired by the height sensor and the position information of the sample acquired by the position sensor, and causes the convergence position adjusting part to adjust the focal position of the electron beam with respect to the surface of the sample based on the focal position correction amount.

2. An electron beam recording apparatus that records information onto the surface of a sample by using an electron beam, comprising:
   an electron source that irradiates the electron beam;
   a magnetic detector that is configured to move onto and out of an irradiation axis and acquires magnetic information on the irradiation axis;
   a convergence position control part that calculates a convergence position correction amount for correcting a convergence position of the electron beam with respect to the surface of the sample based on the magnetic information acquired by the magnetic detector; and
   a convergence position adjusting part that adjusts the convergence position of the electron beam with respect to the surface of the sample;
   wherein the convergence position control part causes the convergence position adjusting part to adjust the convergence position of the electron beam with respect to the surface of the sample based on the convergence position correction amount; and
   wherein the electron beam recording apparatus further comprises:
   a rotating mechanism unit that includes a rotatable turntable on which the sample is placed;
   a feed mechanism unit that moves the turntable of the rotating mechanism unit into a plane orthogonal to the irradiation axis of the electron beam;

a position sensor that is provided in the feed mechanism unit and detects a position of the sample to acquire position information of the sample; and a height sensor that detects a height of the surface of the sample being rotated by the rotating mechanism unit and being moved by the feed mechanism unit to acquire height information of the sample;

wherein the convergence position includes an irradiation position of the electron beam in at least one of two directions that are orthogonal to each other and are orthogonal to the direction in which the irradiation axis extends;

the convergence position adjusting part adjusts the irradiation position of the electron beam with respect to the surface of the sample in at least said one of the two directions orthogonal to each other;

wherein the magnetic sensor acquires magnetic information in at least said one of the two directions orthogonal to each other; and the convergence position control part calculates an irradiation position correction amount for correcting the irradiation position of the electron beam in at least said one of the two directions orthogonal to each other based on the magnetic field information in at least said one of the two directions orthogonal to each other, the magnetic field information being acquired by the magnetic detector and corresponding to the height information of the sample acquired by the height sensor and the position information of the sample acquired by the position sensor, and causes the convergence position adjusting part to adjust the irradiation position of the electron beam with respect to the surface of the sample in at least said one of the two directions orthogonal to each other based on the irradiation position correction amount.

* * * * *

UNITED STATES PATENT AND TRADEMARK OFFICE
CERTIFICATE OF CORRECTION

PATENT NO. : 8,000,203 B2  
APPLICATION NO. : 12/282306  
DATED : August 16, 2011  
INVENTOR(S) : Takashi Obara et al.

It is certified that error appears in the above-identified patent and that said Letters Patent is hereby corrected as shown below:

Title Page;

On the face of the patent, at (73) Assignee, insert the name of the second assignee as follows:

Crestec Corporation, Tokyo, JP

Signed and Sealed this  
Twenty-fifth Day of October, 2011

David J. Kappos  
*Director of the United States Patent and Trademark Office*